US011190316B2

(12) United States Patent
Huang et al.

(10) Patent No.: US 11,190,316 B2
(45) Date of Patent: Nov. 30, 2021

(54) COMMUNICATIONS METHOD AND SYSTEM, AND RELATED DEVICE

(71) Applicant: HUAWEI TECHNOLOGIES CO., LTD., Guangdong (CN)

(72) Inventors: Yi Huang, Shenzhen (CN); Haibao Ren, Shanghai (CN); Liuliu Ji, Shanghai (CN); Yuanjie Li, Shanghai (CN)

(73) Assignee: Huawei Technologies Co., Ltd., Guangdong (CN)

( * ) Notice: Subject to any disclaimer, the term of this patent is extended or adjusted under 35 U.S.C. 154(b) by 56 days.

(21) Appl. No.: 16/567,965

(22) Filed: Sep. 11, 2019

(65) Prior Publication Data

US 2020/0007292 A1 Jan. 2, 2020

Related U.S. Application Data

(63) Continuation of application No. PCT/CN2018/085744, filed on May 5, 2018.

(30) Foreign Application Priority Data

May 5, 2017 (CN) .......................... 201710313437.4
Oct. 11, 2017 (CN) .......................... 201710941202.X

(51) Int. Cl.
*H04L 5/00* (2006.01)
*H04B 7/06* (2006.01)
(Continued)

(52) U.S. Cl.
CPC .......... *H04L 5/0048* (2013.01); *H04L 5/0053* (2013.01); *H04W 72/046* (2013.01); *H04W 72/085* (2013.01); *H04B 7/0691* (2013.01)

(58) Field of Classification Search
CPC .... H04B 7/0695; H04B 7/088; H04B 7/0404; H04B 17/309; H04B 17/318;
(Continued)

(56) References Cited

U.S. PATENT DOCUMENTS

2014/0092855 A1* 4/2014 Ahn ..................... H04W 74/006
370/329
2014/0321442 A1* 10/2014 Kim ...................... H04W 52/40
370/336
(Continued)

FOREIGN PATENT DOCUMENTS

CN 103945539 A 7/2014
CN 104106223 A 10/2014
(Continued)

OTHER PUBLICATIONS

3GPP TS 36.213 V14.0.0 (Sep. 2016), "3rd Generation Partnership Project;Technical Specification Group Radio Access Network; Evolved Universal Terrestrial Radio Access (E-UTRA); Physical layer procedures(Release 14);," Sep. 2016, 406 pages.
(Continued)

*Primary Examiner* — Daniel Lai
(74) *Attorney, Agent, or Firm* — Fish & Richardson P.C.

(57) ABSTRACT

The present disclosure relates to communications methods, systems, and devices. One example communications method includes when a base station determines that a quasi-co-location (QCL) relationship exists between antenna ports of at least two serving cells in a same serving cell group, sending, by the base station and to user equipment (UE), QCL indication signaling used to indicate that the QCL relationship exists between the antenna ports of the at least two serving cells in the same serving cell group, where the same serving cell group is a group predefined according to
(Continued)

a preset rule or is a group obtained after the base station groups serving cells allocated to the UE.

8 Claims, 7 Drawing Sheets

(51) Int. Cl.
  *H04W 72/04* (2009.01)
  *H04W 72/08* (2009.01)
(58) Field of Classification Search
  CPC ...... H04B 17/327; H04B 7/0456; H04B 7/06; H04B 7/0632; H04B 7/024; H04B 7/0417; H04B 7/0619; H04B 7/0691; H04B 17/336; H04B 7/0639; H04B 7/0857; H04W 16/28; H04W 56/001; H04W 24/04; H04W 72/0406; H04W 76/11; H04W 28/06; H04W 36/0027; H04W 36/0061; H04W 36/0069; H04W 56/002; H04W 76/15; H04W 72/046; H04W 72/085; H04L 5/00; H04L 5/0057; H04L 1/0026; H04L 25/0204; H04L 5/0048; H04L 5/0053; H04L 5/0025; H04L 5/005; H04L 5/0094
  See application file for complete search history.

(56) References Cited

U.S. PATENT DOCUMENTS

| | | | |
|---|---|---|---|
| 2015/0117382 A1 | 4/2015 | Wang et al. | |
| 2015/0215856 A1 | 7/2015 | Kim et al. | |
| 2015/0334573 A1* | 11/2015 | Svedman | H04L 5/0051 370/280 |
| 2017/0078062 A1 | 3/2017 | Park et al. | |
| 2017/0353282 A1 | 12/2017 | Park et al. | |
| 2018/0048372 A1* | 2/2018 | Sun | H04B 7/0639 |
| 2019/0239109 A1 | 8/2019 | Kim et al. | |
| 2019/0319680 A1* | 10/2019 | Zhang | H04B 7/0408 |
| 2019/0373614 A1* | 12/2019 | Yum | H04W 72/08 |

FOREIGN PATENT DOCUMENTS

| | | |
|---|---|---|
| CN | 104937869 A | 9/2015 |
| EP | 2800286 A1 | 11/2014 |

OTHER PUBLICATIONS

3GPP TS 36.321 V14.2.1 (Mar. 2017), "3rd Generation Partnership Project; Technical Specification Group Radio Access Network; Evolved Universal Terrestrial Radio Access (E-UTRA); Medium Access Control (MAC) protocol specification (Release 14)," Mar. 2017, 106 pages.

3GPP TR 36.823 V11.0.1 (Sep. 2013), "3rd Generation Partnership Project;Technical Specification Group Radio Access Network; Evolved Universal Terrestrial Radio Access (E-UTRA); Carrier aggregation enhancements; User Equipment (UE) and Base Station (BS) radio transmission and reception (Release 11)," Sep. 2013, 35 pages.

Catt et al., "WF on QCL," 3GPP TSG RAN WG1 Meeting #88, R1-1703736; Athens, Greece, Feb. 13-17, 2017, 3 pages.

Ericsson, "UL MIMO for NR," 3GPP TSG-RAN WG1 #87, R1-1612320; Reno, USA, Nov. 14-18, 2016, 3 pages.

Extended European Search Report issued in European Application No. 1874568.8 dated Jan. 29, 2020, 8 pages.

PCT International Search Report and Written Opinion issued in International Application No. PCT/CN2018/085744 dated Jul. 11, 2018, 18 pages (with English translation).

* cited by examiner

COMMUNICATIONS METHOD AND SYSTEM, AND RELATED DEVICE

CROSS-REFERENCE TO RELATED APPLICATIONS

This application is a continuation of International Application No. PCT/CN2018/085744, filed on May 5, 2018, which claims priority to Chinese Patent Application No. 201710313437.4, filed on May 5, 2017 and Chinese Patent Application No. 201710941202.X, filed on Oct. 11, 2017. The disclosures of the aforementioned applications are hereby incorporated by reference in their entireties.

TECHNICAL FIELD

This application relates to the communications field, and specifically, to a communications method and system, and a related device.

BACKGROUND

Coordinated multipoint (CoMP) transmission is a method proposed in long term evolution (LTE) for resolving a problem of inter-cell interference and improving a throughput of a cell edge user. To support CoMP, that is, to enable user equipment (UE) to receive a physical downlink control channel (PDCCH) from a service network device and to receive a physical downlink shared channel (PDSCH) from the service network device, a coordinated network side device, or both the service network device and the coordinated network side device, an antenna port quasi-co-location (QCL) concept is introduced in an LTE system. If two antenna ports are considered to be in QCL, large-scale channel information of one antenna port can be inferred from large-scale channel information of the other antenna port. On the contrary, if two antenna ports are considered to be in non-QCL, the UE cannot assume that large-scale channel information of one antenna port may be inferred from large-scale channel information of the other antenna port. The large-scale channel information includes: an average channel gain (average gain), a Doppler spread (Doppler spread), a Doppler shift (Doppler shift), an average delay (average delay), and a delay spread (delay spread).

In a 5th generation (5G) communications system, a multi-panel large-scale antenna array structure is also configured at a single transmission point (Transmit-Receiving Point, TRP for short), and because of such a structure, different beams formed by different antenna panels have different large-scale information. A base station aligns one transmit beam with UE in a downlink direction, and the UE aligns one receive beam with the base station, to implement communication. On the contrary, the UE aligns one transmit beam with the base station in an uplink direction, and the base station aligns one receive beam with the UE. To implement beam alignment between the base station and the UE, a beam management process is introduced in the 5G communications system. For example, the UE first uses a fixed receive beam, and after the base station scans at least one transmit beam by transmitting a pilot, the UE feeds back an indication of a beam having a strongest received signal. The base station retransmits a pilot by using the beam fed back by the UE, and then the UE optimizes the receive beam through a beam scanning process. When the base station performs delivery to the UE by using a beam or the UE performs uploading to the base station by using a beam, different logical antenna ports are used for different signals.

For example, a channel state information-reference signal (CSI-RS) antenna port is used to transmit a CSI-RS, and a demodulation reference signals (DMRS) antenna port is used to transmit a demodulation reference signal. When large-scale channel information of two antenna ports indicates that the two antenna ports are in QCL, it is considered that a beam used to transmit a reference signal corresponding to one antenna port may also be used to transmit a reference signal corresponding to the other antenna port.

It can be learned that in the beam management process, the base station needs to transmit pilots twice, and the UE needs to feed back an indication of a strongest beam, to determine a transmit beam and a receive beam. In addition, the base station and the UE each may first align a coarse beam, and then align a fine beam in coarse beams. Consequently, the foregoing process needs to be performed twice, and a large quantity of pilot and feedback overheads are consumed.

SUMMARY

Embodiments of this application provide a communications method and system, and a related device. According to the communications method and system, or the related device, a QCL relationship between antenna ports of different serving cells serving UE can be determined, to reduce pilot resource overheads and signaling overheads of beam management.

A first aspect of the embodiments of this application provides a communications method. In the method, there are serving cell groups for serving cells serving UE, and the serving cell groups may be groups predefined according to a preset rule or may be groups obtained after a base station groups the serving cells allocated to the UE. Then, when determining that there is a QCL relationship between antenna ports of at least two serving cells in a same serving cell group, the base station delivers the QCL relationship to the UE by using QCL indication signaling, so that the UE learns that reference signals may be transmitted by using a same beam on the antenna ports that are in the QCL relationship and that are of the at least two serving cells.

It can be learned that in the foregoing method, because the serving cells serving the UE are grouped into the serving cell groups in advance, and the QCL relationship between the antenna ports of the at least two serving cells in the same serving cell group is determined, when it is determined that there is the QCL relationship between the antenna ports of the at least two serving cells, the QCL relationship is indicated to the UE by using the QCL indication signaling, so that the base station does not need to perform beam management on a beam corresponding to each serving cell, and only needs to separately perform beam management for serving cells that do not have a QCL relationship, and performs beam management for only one of serving cells that have a QCL relationship, thereby reducing pilot and feedback overheads in a beam management process.

In some embodiments, if the serving cell group is obtained after the base station groups the serving cells allocated to the UE, the base station needs to send information about the serving cell group to the UE by using higher layer signaling, so that the UE learns of the information about the serving cell group serving the UE, and when the base station subsequently notifies the QCL relationship, a selection range is narrowed down when a reference signal is sent by using a serving cell.

In some embodiments, after grouping the serving cells, the base station may directly specify that there is a QCL relationship between antenna ports of serving cells in the same serving cell group. In this manner, when determining the QCL relationship between the antenna ports of the serving cells in the same serving cell group, the base station directly sends a QCL indication according to the rule used to define the same serving cell group.

In some embodiments, a specific process of determining, by the base station, that there is the QCL relationship between the antenna ports of the at least two serving cells in the same serving cell group may be as follows: First, the base station sends measurement pilots to the UE by using beams of the at least two serving cells; and then the base station receives a QCL determining indication or a beam ID sent by the UE, and determines, based on the QCL determining indication or the beam ID, that there is the QCL relationship between the antenna ports of the at least two serving cells. The QCL determining indication or the beam ID corresponds to a beam having target channel quality, the beam having the target channel quality is a beam that is determined by the UE and that has relatively high channel quality, and the QCL determining indication is a bit that is obtained by the UE through estimation and that is used to indicate whether the beams of the at least two serving cells meet a QCL relationship between spatial characteristic parameters. The base station can determine the QCL relationship between the antenna ports of the at least two serving cells by using the bit, so that implementability of the solutions of this application is improved.

In some embodiments, a specific process of determining, by the base station, that there is the QCL relationship between the antenna ports of the at least two serving cells in the same serving cell group may be: determining the QCL relationship between the antenna ports of the at least two serving cells based on a carrier frequency spacing between or propagation paths of component carriers corresponding to the at least two serving cells. The carrier frequency spacing is a carrier frequency spacing between component carriers in carrier aggregation, each component carrier is one serving cell, and component carriers having close carrier frequencies are considered as having similar beam spatial characteristics, that is, there is the QCL relationship between the antenna ports of the serving cells. In addition, component carriers having a same propagation path also have similar beam spatial characteristics.

In some embodiments, the serving cell group is predefined by using the preset rule, for example, is directly defined in a protocol. The base station and the UE can learn of a status of the serving cell group by using the protocol. The group may be predefined according to the preset rule in the following manners: In a first manner, N serving cells corresponding to the UE are grouped into M serving cell groups, where N is greater than or equal to M, and both M and N are integers greater than or equal to 1; and in a second manner, the following is predefined: serving cells using a same timing advance and a same timing reference cell are grouped into a same timing advance group TAG. According to the predefinition manner, the base station does not need to deliver grouping information of the serving cells to the UE by using higher layer signaling, and in this case, the base station only needs to deliver a QCL indication, so that signaling overheads can be further reduced.

In some embodiments, the following may be further directly defined: there is a QCL relationship between antenna ports of serving cells in one timing advance group (TAG). In this case, the base station can more quickly determine the QCL relationship between the antenna ports of the serving cells, so that communication efficiency is further improved.

In some embodiments, there are two cases in which there is the QCL relationship between the antenna ports of the at least two serving cells. In one case, the antenna ports of the at least two serving cells have a same average channel gain. In the other case, the antenna ports of the at least two serving cells have at least one same parameter in at least one spatial characteristic parameter, where the spatial characteristic parameter includes at least one of an angle of arrival (AoA), an angle of departure (AoD), a power azimuth/angular spectrum of angle of arrival (PAS of AoA), a power azimuth/angular spectrum of angle of departure (PAS of AoD), a receiving antenna spatial correlation (Receiving Antenna Spatial Correlation), a transmit antenna spatial correlation (Transmit Antenna Spatial Correlation), receiving beamforming (receiving beamforming), transmit beamforming (transmit beamforming), and spatial filtering (Spatial filtering).

Alternatively, for a case in which there is the QCL relationship between the antenna ports of the at least two serving cells, refer to a definition in LTE. If two antenna ports are considered to be in QCL, large-scale channel information of one antenna port can be inferred from large-scale channel information of the other antenna port. The large-scale channel information includes an average channel gain, a Doppler spread, a Doppler shift, an average delay, and a delay spread. The antenna port represents time domain and frequency domain resources corresponding to a reference signal, and the reference signal includes at least one or more of a channel state information-reference signal (channel state information-reference signal, CSI-RS), a demodulation reference signal (demodulation reference signal, DMRS), a phase tracking reference signal (phase tracking reference signal, PTRS) (or referred to as a phase compensation reference signal (phase compensation reference signal, PCRS) or a phase noise reference signal (briefly referred to as a phase noise reference signal)), and a synchronization signal block (synchronization signal block, SS block) (including one or more of a synchronization signal and a broadcast channel, where the synchronization signal includes a primary synchronization signal PSS and/or a secondary synchronization signal SSS).

A second aspect of the embodiments of the present invention provides a communications method. In the method, there are serving cell groups for serving cells serving UE, and the serving cell groups may be groups predefined according to a preset rule or may be groups obtained after a base station groups the serving cells allocated to the UE. Then, when determining that there is a QCL relationship between antenna ports of serving cells in different serving cell groups, the base station delivers the QCL relationship to the UE by using QCL indication signaling, so that the UE learns that reference signals may be transmitted by using a same beam on the antenna ports that are in the QCL relationship and that are of the serving cells in the different serving cell groups.

It can be learned that in the foregoing method, because the serving cells serving the UE are grouped into the serving cell groups in advance, and the QCL relationship between the antenna ports of the serving cells in the different serving cell groups is determined, when it is determined that there is the QCL relationship between the antenna ports of the serving cells in the different serving cell groups, the relationship is indicated to the UE by using the QCL indication signaling, so that the base station does not need to perform beam management on a beam corresponding to each serving cell, and only needs to separately perform beam management for serving cells whose antenna ports are not in a QCL relationship, and performs beam management for only one of serving cells whose antenna ports are in a QCL relationship, thereby reducing pilot and feedback overheads in a beam management process.

In some embodiments, if the serving cell groups are obtained after the base station groups the serving cells allocated to the UE, the base station needs to send information about the serving cell groups to the UE by using higher layer signaling, so that the UE learns of the information about the serving cell groups serving the UE, and when the base station subsequently notifies the QCL relationship by using the QCL indication signaling, a selection range is narrowed down when the UE sends a reference signal by using a serving cell.

In some embodiments, after grouping the serving cells, the base station may directly specify that there is a QCL relationship between antenna ports of serving cells in the different serving cell groups. In this manner, when determining the QCL relationship between the antenna ports of the serving cells in the different serving cell groups, the base station directly sends a QCL indication according to the rule used to define the different serving cell groups.

In some embodiments, a specific process of determining, by the base station, that there is the QCL relationship between the antenna ports of the serving cells in the different serving cell groups may be as follows: First, the base station sends measurement pilots to the UE by using beams of the serving cells in the different serving cell groups; and then the base station receives a QCL determining indication or a beam ID sent by the UE, and determines, based on the QCL determining indication or the beam ID, that there is the QCL relationship between the antenna ports of the serving cells in the different serving cell groups. The QCL determining indication or the beam ID corresponds to a beam having target channel quality, the beam having the target channel quality is a beam that is determined by the UE and that has relatively high channel quality, and the QCL determining indication is a bit that is obtained by the UE through estimation and that is used to indicate whether the beams of the serving cells in the different serving cell groups meet a QCL relationship between spatial characteristic parameters. The base station can determine the QCL relationship between the antenna ports of the serving cells in the different serving cell groups by using the bit, so that implementability of the solutions of this application is improved.

In some embodiments, a specific process of determining, by the base station, that there is the QCL relationship between the antenna ports of the serving cells in the different serving cell groups may be: determining the QCL relationship between the antenna ports of the serving cells in the different serving cell groups based on a carrier frequency spacing between component carriers corresponding to the serving cells in the different serving cell groups or propagation paths of component carriers corresponding to the serving cells in the different serving cell groups, where the carrier frequency spacing is a carrier frequency spacing between component carriers in carrier aggregation, each component carrier is one serving cell, and component carriers having close carrier frequencies are considered as having similar beam spatial characteristics, that is, there is the QCL relationship between the antenna ports of the serving cells. In addition, component carriers having a same propagation path also have similar beam spatial characteristics.

In some embodiments, the serving cell group is predefined by using the preset rule, for example, is directly defined in a protocol. The base station and the UE can learn a status of the serving cell group by using the protocol. The group may be predefined according to the preset rule in the following manners: In a first manner, N serving cells corresponding to the UE are grouped into M serving cell groups, where N is greater than or equal to M, and both M and N are integers greater than or equal to 1; and in a second manner, the following is predefined: serving cells using a same timing advance and a same timing reference cell are grouped into different timing advance groups TAGs. According to the predefinition manner, the base station does not need to deliver grouping information of the serving cells to the UE by using higher layer signaling, and in this case, the base station only needs to deliver a QCL indication, so that signaling overheads can be further reduced.

In some embodiments, the following may be further directly defined: there is a QCL relationship between antenna ports of serving cells in different TAGs. In this case, the base station can more quickly determine the QCL relationship between the antenna ports of the serving cells, so that communication efficiency is further improved.

In some embodiments, there are two cases in which there is the QCL relationship between the antenna ports of the at least two serving cells. In one case, the antenna ports of the at least two serving cells have a same average channel gain. In the other case, the antenna ports of the at least two serving cells have at least one same parameter in at least one spatial characteristic parameter, where the spatial characteristic parameter includes at least one of an AoA, an AoD, a PAS-of-AoA, a PAS-of-AoD, a receiving antenna spatial correlation, a transmit antenna spatial correlation, receiving beamforming, transmit beamforming, and spatial filtering (Spatial filtering).

Alternatively, for a case in which there is the QCL relationship between the antenna ports of the at least two serving cells, refer to a definition in LTE. If two antenna ports are considered to be in QCL, large-scale channel information of one antenna port can be inferred from large-scale channel information of the other antenna port. The large-scale channel information includes an average channel gain, a Doppler spread, a Doppler shift, an average delay, and a delay spread. The antenna port represents time domain and frequency domain resources corresponding to a reference signal, and the reference signal includes at least one or more of a channel state information-reference signal (channel state information-reference signal, CSI-RS), a demodulation reference signal (demodulation reference signal, DMRS), a phase tracking reference signal (phase tracking reference signal, PTRS) (or referred to as a phase compensation reference signal (phase compensation reference signal, PCRS) or a phase noise reference signal (briefly referred to as a phase noise reference signal)), and a synchronization signal block (synchronization signal block, SS block) (including one or more of a synchronization signal and a broadcast channel, where the synchronization signal includes a primary synchronization signal PSS and/or a secondary synchronization signal SSS).

A third aspect of the embodiments of this application further provides a communications method. In the method, UE receives QCL indication signaling delivered by a base station, where the QCL indication signaling indicates that there is a QCL relationship between antenna ports of at least two serving cells in a same serving cell group, and the serving cell group may be obtained in two manners: In a first manner, the serving cell group is a group obtained after the base station groups serving cells allocated to the UE; and in a second manner, the serving cell group is a group predefined according to a preset rule. Then, the UE determines, based on the QCL indication signaling, to receive reference signals of the serving cells by using a same receive beam or transmit reference signals of the serving cells by using a same transmit beam in the at least two serving cells whose antenna ports are in the QCL relationship and that are in the same serving cell group.

It can be learned that because the serving cells serving the UE are grouped, and the QCL relationship between the antenna ports of the at least two cells in the serving cell group is determined, the at least two serving cells whose antenna ports are in the QCL relationship are sent to the UE by using the QCL indication signaling, so that the UE does not need to cooperate with the base station in performing beam measurement on beams of all corresponding serving cells, thereby reducing pilot and feedback overheads of beam management.

In some embodiments, the serving cell group is a TAG, and a feature of the TAG group is that serving cells in a same TAG have a same timing advance and a same timing reference cell. There is a relatively high probability that there is a QCL relationship between antenna ports of serving cells that are grouped into a same TAG in this manner.

In some embodiments, a process of cooperating, by the UE, with the base station in performing beam management is as follows: First, the UE receives measurement pilots that are sent by the base station by using beams of the at least two serving cells; and then the UE determines, based on the beams of the at least two serving cells, a QCL determining indication or a beam ID of a beam having target channel quality, where the QCL determining indication is a determining bit that is obtained by the UE through estimation and that is used to indicate whether the beams of the at least two serving cells meet a QCL relationship between spatial characteristic parameters. In other words, the UE can feed back the QCL determining indication or the beam ID of the beam having the target channel quality, so that the base station determines the QCL relationship between the antenna ports of the at least two serving cells by using the QCL determining indication or the beam ID.

In some embodiments, if the serving cell group is a group obtained after the base station groups the serving cells allocated to the UE, the UE receives information that is about the serving cell group and that is delivered by the base station by using higher layer signaling, to learn a status of the serving cell group, so that a selection range is narrowed down when a reference signal is sent by using a serving cell.

A fourth aspect of the embodiments of this application further provides a communications method. In the method, UE receives QCL indication signaling delivered by a base station, where the QCL indication signaling indicates that there is a QCL relationship between antenna ports of serving cells in different serving cell groups, and the serving cell groups may be obtained in two manners: In a first manner, the serving cell groups are groups obtained after the base station groups serving cells allocated to the UE; and in a second manner, the serving cell groups are groups predefined according to a preset rule. Then, the UE determines, based on the QCL indication signaling, to receive reference signals of the serving cells by using a same receive beam or transmit reference signals of the serving cells by using a same transmit beam in the serving cells whose antenna ports are in the QCL relationship and that are in the different serving cell groups.

It can be learned that because the serving cells serving the UE are grouped, and the QCL relationship between the antenna ports of the two cells in the different serving cell groups is determined, the serving cells whose antenna ports are in the QCL relationship are sent to the UE by using the QCL indication signaling, so that the UE does not need to cooperate with the base station in performing beam measurement on beams of all corresponding serving cells, thereby reducing pilot and feedback overheads of beam management.

In some embodiments, the serving cell group is a TAG, and a feature of the TAG group is that serving cells in a same TAG have a same timing advance and a same timing reference cell.

In some embodiments, a process of cooperating, by the UE, with the base station in performing beam management is as follows: First, the UE receives measurement pilots that are sent by the base station by using beams of the serving cells in the different serving cell groups; and then the UE determines, based on the beams of the two serving cells in the different serving cell groups, a QCL determining indication or a beam ID of a beam having target channel quality, where the QCL determining indication is a determining bit that is obtained by the UE through estimation and that is used to indicate whether the beams of the serving cells in the different serving cell groups meet a QCL relationship between spatial characteristic parameters. In other words, the UE can feed back the QCL determining indication or the beam ID of the beam having the target channel quality, so that the base station determines the QCL relationship between the antenna ports of the serving cells in the different serving cell groups by using the QCL determining indication or the beam ID.

In some embodiments, if the serving cell groups are groups obtained after the base station groups the serving cells allocated to the UE, the UE receives information that is about the serving cell groups and that is delivered by the base station by using higher layer signaling, to learn a status of the serving cell groups, so that a selection range is narrowed down when a reference signal is sent by using a serving cell.

A fifth aspect of the embodiments of this application further provides a base station, including a processing module and a sending module.

The processing module is configured to: when the base station determines that there is a quasi-co-location QCL relationship between antenna ports of at least two serving cells in a same serving cell group, send, to the UE by using the sending module, QCL indication signaling used to indicate that there is the QCL relationship between the antenna ports of the at least two serving cells, where the serving cell group is a group predefined according to a preset rule or is a group obtained after the base station groups serving cells allocated to the user equipment UE.

In some embodiments, the serving cell group is obtained after the base station groups the serving cells allocated to the user equipment UE, and the sending module is further configured to:

deliver information about the serving cell group to the UE by using higher layer signaling.

In some embodiments, there is a QCL relationship between antenna ports of serving cells in the same serving cell group.

In some embodiments, the processing module is specifically configured to:

send measurement pilots to the UE by using beams of the at least two serving cells;

receive a QCL determining indication or a beam ID that is determined by the UE and that is of a beam having target channel quality, where the QCL determining indication is a determining bit that is obtained by the UE through estimation and that is used to indicate whether the beams of the at least two serving cells meet a QCL relationship between spatial characteristic parameters; and determine, based on the received QCL determining indication or beam ID, that there is the QCL relationship between the antenna ports of the at least two serving cells.

In some embodiments, the processing module is specifically configured to:

determine, based on a carrier frequency spacing between or propagation paths of component carriers corresponding to the at least two serving cells, that there is the QCL relationship between the antenna ports of the at least two serving cells.

In some embodiments, the processing module is further configured to:

group N serving cells corresponding to the UE into M serving cell groups, where N is greater than or equal to M, and both M and N are integers greater than or equal to 1; or group serving cells having a same timing advance and a same timing reference cell into a same timing advance group TAG In some embodiments, there is a QCL relationship between antenna ports of serving cells in one TAG.

In some embodiments, there is no QCL relationship between antenna ports of serving cells in different TAGs.

In some embodiments, that there is the QCL relationship between the antenna ports of the at least two serving cells is that the antenna ports of the at least two serving cells have a same average channel gain or at least one same parameter in at least one spatial characteristic parameter, where the spatial characteristic parameter includes at least one of an angle of arrival AoA, an angle of departure AoD, a power azimuth/angular spectrum of angle of arrival PAS-of-AoA, a power azimuth/angular spectrum of angle of departure PAS-of-AoD, a receiving antenna spatial correlation, a transmit antenna spatial correlation, receiving beamforming, and transmit beamforming.

A sixth aspect of the embodiments of this application further provides a base station, including a processing module and a sending module.

The processing module is configured to: when the base station determines that there is a QCL relationship between antenna ports of serving cells in different serving cell groups, send, to UE by using the sending module, QCL indication signaling used to indicate that there is the QCL relationship between the antenna ports of the serving cells in the different groups, where the serving cell groups are groups predefined according to a preset rule or are groups obtained after the base station groups serving cells allocated to the user equipment UE.

In some embodiments, the serving cell groups are obtained after the base station groups the serving cells allocated to the UE, and the sending module is further configured to:

deliver information about the serving cell groups to the UE by using higher layer signaling.

In some embodiments, there is a QCL relationship between antenna ports of serving cells in the different serving cell groups.

In some embodiments, the processing module is specifically configured to:

send measurement pilots to the UE by using beams of the serving cells in the different groups;

receive a QCL determining indication or a beam ID that is determined by the UE and that is of a beam having target channel quality, where the QCL determining indication is a determining bit that is obtained by the UE through estimation and that is used to indicate whether the beams of the serving cells in the different groups meet a QCL relationship between spatial characteristic parameters; and determine the QCL relationship between the antenna ports of the different serving cells based on the QCL determining indication or the beam ID.

In some embodiments, the processing module is specifically configured to:

determine, based on a carrier frequency spacing between or propagation paths of component carriers corresponding to the serving cells in the different serving cell groups, that there is the QCL relationship between the antenna ports of the serving cells in the different groups.

In some embodiments, the processing module is further configured to:

group N serving cells corresponding to the UE into M serving cell groups, where N is greater than or equal to M, and both M and N are integers greater than or equal to 1; or group serving cells having a same timing advance and a same timing reference cell into a same timing advance group TAG In some embodiments, there is a QCL relationship between antenna ports of serving cells in different TAGs.

In some embodiments, that there is the QCL relationship between the antenna ports of the at least two serving cells is that the antenna ports of the at least two serving cells have a same average channel gain or at least one same parameter in at least one spatial characteristic parameter, where the spatial characteristic parameter includes at least one of an angle of arrival AoA, an angle of departure AoD, a power azimuth/angular spectrum of angle of arrival PAS-of-AoA, a power azimuth/angular spectrum of angle of departure PAS-of-AoD, a receiving antenna spatial correlation, a transmit antenna spatial correlation, receiving beamforming, and transmit beamforming.

A seventh aspect of this application further provides a terminal, including a receiving module and a processing module.

The receiving module is configured to receive quasi-co-location QCL indication signaling delivered by a base station, where the QCL indication signaling is used to indicate that there is a QCL relationship between antenna ports of at least two serving cells in a same serving cell group, and the serving cell group is a group obtained after the base station groups serving cells allocated to the UE or is a group predefined according to a preset rule.

The processing module is configured to determine, based on the QCL indication signaling, to receive reference signals of the serving cells by using a same receive beam or transmit reference signals of the serving cells by using a same transmit beam in the at least two serving cells whose antenna ports are in the QCL relationship and that are in the same serving cell group.

In some embodiments, the serving cell group is a timing advance group TAG and serving cells in a same TAG have a same timing advance and a same timing reference cell.

In some embodiments, the receiving module is further configured to receive measurement pilots that are sent by the base station by using beams of the at least two serving cells; the processing module determines, based on the beams of the at least two serving cells, a QCL determining indication or a beam ID of a beam having target channel quality, where the QCL determining indication is a determining bit that is obtained by the UE through estimation and that is used to indicate whether the beams of the at least two serving cells meet a QCL relationship between spatial characteristic parameters; and the terminal further includes a sending module, configured to feed back the QCL determining indication or the beam ID to the base station.

In some embodiments, the serving cell group is a group obtained after the base station groups the serving cells allocated to the UE, and the receiving module is further configured to:

receive information that is about the serving cell group and that is delivered by the base station by using higher layer signaling.

An eighth aspect of this application further provides a terminal, including a receiving module and a processing module.

The receiving module is configured to receive quasi-colocation QCL indication signaling delivered by a base station, where the QCL indication signaling is used to indicate that there is a QCL relationship between antenna ports of serving cells in different serving cell groups, and the serving cell groups are groups obtained after the base station groups serving cells allocated to the UE or are groups predefined according to a preset rule.

The processing module is configured to determine, based on the QCL indication signaling, to receive reference signals of the serving cells by using a same receive beam or transmit reference signals of the serving cells by using a same transmit beam in the serving cells whose antenna ports are in the QCL relationship and that are in the different serving cell groups.

In some embodiments, the serving cell group is a timing advance group TAG and serving cells in a same TAG have a same timing advance and a same timing reference cell.

In some embodiments, the receiving module is further configured to receive measurement pilots that are sent by the base station by using beams of the serving cells in the different serving cell groups;

the processing module determines, based on the beams of the serving cells in the different serving cell groups, a QCL determining indication or a beam ID of a beam having target channel quality, where the QCL determining indication is a determining bit that is obtained by the UE through estimation and that is used to indicate whether the beams of the at least two serving cells meet a QCL relationship between spatial characteristic parameters; and the terminal further includes a sending module, configured to feed back the QCL determining indication or the beam ID to the base station.

In some embodiments, the serving cell groups are groups obtained after the base station groups the serving cells allocated to the UE, and the receiving module is further configured to:

receive information that is about the serving cell groups and that is delivered by the base station by using higher layer signaling.

A ninth aspect of the embodiments of this application further provides a base station. The base station includes a processor, and a transceiver and a memory that are connected to the processor. The memory is configured to store an instruction, and the processor is configured to execute the instruction to perform the communications method provided in any one of the first aspect or the implementations of the first aspect of this application.

A tenth aspect of the embodiments of this application further provides a base station. The base station includes a processor, and a transceiver and a memory that are connected to the processor. The memory is configured to store an instruction, and the processor is configured to execute the instruction to perform the communications method provided in any one of the second aspect or the implementations of the second aspect of this application.

An eleventh aspect of the embodiments of this application further provides a terminal. The terminal includes a processor, and a transceiver and a memory that are connected to the processor. The memory is configured to store an instruction, and the processor is configured to execute the instruction to perform the communications method provided in any one of the third aspect or the implementations of the third aspect of this application.

A twelfth aspect of the embodiments of this application further provides a terminal. The terminal includes a processor, and a transceiver and a memory that are connected to the processor. The memory is configured to store an instruction, and the processor is configured to execute the instruction to perform the communications method provided in any one of the fourth aspect or the implementations of the fourth aspect of this application.

A thirteenth aspect of this application further provides a communications system. The communications system includes the base station provided in the ninth aspect of the embodiments of this application and the terminal provided in the eleventh aspect of the embodiments of this application.

In some embodiments, the communications system includes two base stations provided in the ninth aspect of the embodiments of this application.

A fourteenth aspect of this application further provides a communications system. The communications system includes the base station provided in the tenth aspect of the embodiments of this application and the terminal provided in the twelfth aspect of the embodiments of this application.

In some embodiments, the communications system includes two base stations provided in the tenth aspect of the embodiments of this application.

Another aspect of this application provides a computer readable storage medium. The storage medium stores program code, and when the program code is run by a base station, a computer is enabled to perform the methods in the foregoing aspects. The storage medium includes but is not limited to a flash memory (flash memory), a hard disk drive (HDD), or a solid state drive (SSD).

Another aspect of this application provides a computer program product including an instruction; and when the computer program product is run on a computer, the computer is enabled to perform the methods in the foregoing aspects.

DESCRIPTION OF EMBODIMENTS

Figure 1:
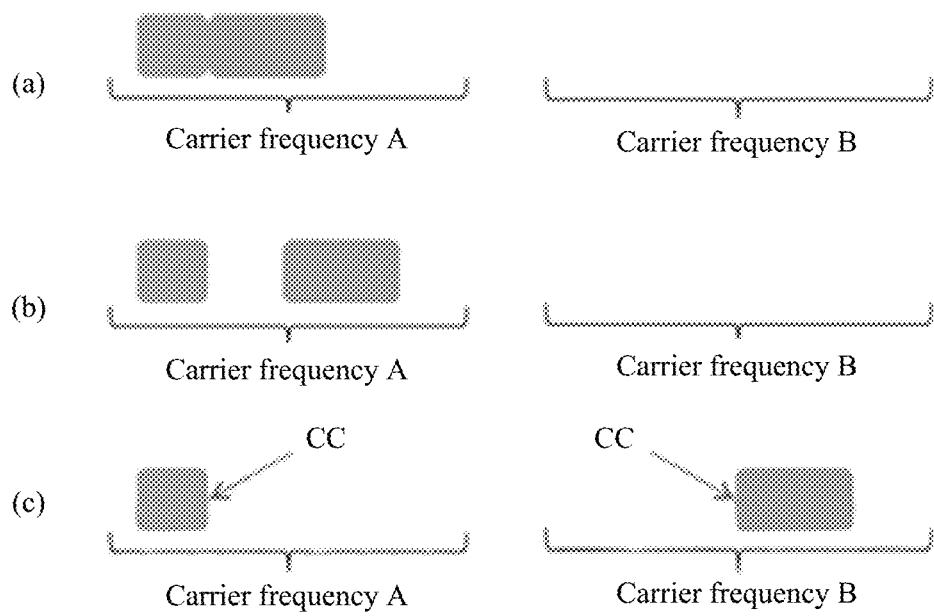
FIG. 1 is a schematic diagram of carrier aggregation types.

Embodiments of this application provide a communications method and system, and a related device. Serving cells serving UE are grouped, and a QCL relationship between antenna ports of at least two serving cells in a serving cell group is sent to the UE by using QCL indication signaling, so that the UE can transmit a reference signal based on the QCL indication signaling, thereby reducing pilot and feedback overheads of beam management.

To make persons skilled in the art understand the technical solutions in this application better, the following describes the embodiments of this application with reference to the accompanying drawings in the embodiments of this application.

In the specification, claims, and accompanying drawings of this application, the terms "first", "second", "third", "fourth", and the like (if existent) are intended to distinguish between similar objects but do not necessarily indicate a specific order or sequence. It should be understood that the data termed in such a way are interchangeable in proper circumstances so that the embodiments described herein can be implemented in other orders than the order illustrated or described herein. In addition, the terms "include", "contain" and any other variants thereof are intended to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

A main system architecture applied to this application includes a base station and a terminal. Both the base station and the terminal may work on a licensed band or a license-free band. In this application, both the licensed band and the license-free band may include one or more carriers, carrier aggregation is performed for the licensed band and license-free band, and the following case may be included: carrier aggregation is performed on one or more carriers included in the licensed band and one or more carriers included in the license-free band. In this application, a cell may be a cell corresponding to a base station, and the cell may belong to a macro base station, or a base station corresponding to a small cell (small cell). The small cell herein may include a metro cell (Metro cell), a micro cell (Micro cell), a pico cell (Pico cell), a femto cell (Femto cell), and the like. The small cells are characterized by small coverage and a low transmit power, and are applicable to providing a high-rate data transmission service. A plurality of cells may work on a same frequency on a carrier in a wireless communications system. In some special scenarios, it may be considered that a concept of a carrier is equivalent to a concept of a cell in the wireless communications system. For example, in a carrier aggregation scenario, when a secondary carrier is configured for a terminal device, a carrier index of the secondary carrier and a cell identification (Cell Identification, Cell ID) of a secondary cell working on the secondary carrier are carried. In this case, it may be considered that the concept of the carrier is equivalent to the concept of cell. For example, that a terminal device accesses a carrier is equivalent to that a terminal device accesses a cell.

It should be noted that for a component carrier (CC) and a serving cell in this application, there is a one-to-one correspondence between the CC and the serving cell. When the logical concepts of component carrier and serving cell are described in this application, the logical concepts of component carrier and serving cell may be considered as being equivalent. When a physical characteristic of the CC needs to be described, the concept of serving cell is not equivalent to the concept of CC, but there is still a one-to-one correspondence between the serving cell and the CC. In a scenario of describing the physical characteristic of the CC, for example, a carrier frequency, a propagation path, or a corresponding beam of the CC, a spacing between two CCs and propagation paths of the CCs, or beams corresponding to the CCs, the concept of CC is not equivalent to the concept of serving cell.

The component carrier CC may represent a component carrier in carrier aggregation, or a bandwidth part (bandwidth part, BWP). The component carrier may be a segment of continuous frequency domain resources in a transmission bandwidth of a cell, a segment of discontinuous frequency domain resources in a transmission bandwidth of a cell, or the like. A bandwidth of at least one component carrier may be divided into one or more bandwidth parts (bandwidth part, BWP) (or referred to as a carrier bandwidth part, carrier bandwidth part, CBWP). Each BWP corresponds to at least one continuous physical resource block (resource block, RB) in frequency domain. Different BWPs may have a same frame structure parameter (numerology), or different frame structure parameters. The frame structure parameter includes at least one of a subcarrier spacing, a slot configuration parameter, a cyclic prefix CP length, and a transmission time interval TTI. A serving cell grouping method in the present invention is applicable to both carrier grouping and bandwidth part grouping. A method for indicating QCL between different serving cells is applicable to indicating QCL between antenna ports of different carriers and indicating QCL between antenna ports of different bandwidth parts.

It may be understood that in an LTE or LTE-A system, from the perspective of a time dimension, a time length of a radio frame is 10 ms, a time length of a subframe is 1 ms, and one radio frame includes 10 subframes. There are specifically two subframe formats. One is a normal cyclic prefix (NCP) subframe format: One NCP subframe includes 14 OFDM symbols or two slots; and the OFDM symbols are numbered from 0 to 13, a zeroth symbol to a sixth OFDM symbol are an odd-numbered slot, and a seventh OFDM symbol to a thirteenth OFDM symbol are an even-numbered slot. The other is an extended cyclic prefix (Extended Cyclic Prefix, ECP) subframe format: One ECP subframe includes 12 OFDM symbols or two slots; and the OFDM symbols are numbered from 0 to 11, a zeroth OFDM symbol to a fifth OFDM symbol are an odd-numbered slot, and a sixth OFDM symbol to an eleventh OFDM symbol are an even-numbered slot.

From the perspective of a frequency dimension, a minimum unit is a subcarrier. From the perspective of time and frequency dimensions, for a resource used for transmission on an antenna port, a smallest unit is a resource element (Resource Element, RE), and one RE includes one OFDM symbol in time domain and one subcarrier in frequency domain. A resource element group (Resource-Element Group, REG) may include an integer quantity of REs. For example, one REG may include four REs or 16 REs. One physical resource block (Physical Resource Block, PRB) includes one slot in time domain and 12 subcarriers in frequency domain. One subframe includes one PRB pair (PRB pair). A resource block group (Resource Block Group, RBG) may include an integer quantity of PRBs. For example, one RBG may include one PRB, two PRBs, three PRBs, four PRBs, or another integer quantity of PRBs.

It should be noted that one serving cell usually corresponds to a plurality of types of antenna ports, and the antenna ports may be classified into four categories. A first category is a cell-specific reference signal (CRS); a second category is a multimedia broadcast multicast service single frequency network (MBSFN) reference signal (MBSFN reference signals); a third category is a UE-specific reference signal (UE-specific reference signals), which is alternatively referred to as a demodulation reference signal (DMRS); and a fourth category is a positioning reference signal (Positioning reference signals). Each antenna port is used to transmit one reference signal. An antenna port is a logical port used for transmission, and may correspond to one or more actual physical antennas. The antenna port is defined from the perspective of a receiver. In other words, if a receiver needs to distinguish between spatial differences between resources, a plurality of antenna ports need to be defined. For UE, a reference signal that is received by the UE and that corresponds to an antenna port defines the corresponding antenna port. The reference signal may be obtained by combining signals transmitted by using a plurality of physical antennas. In LTE, a CRS supports three types of antenna port configuration: one-antenna port configuration, 2-antenna port configuration, and 4-antenna port configuration; and corresponding port numbers are respectively: p=0, p={0, 1}, and p={0, 1, 2, 3}. For example, a base station may configure a cell-specific antenna port (Cell-specific antenna port), and a quantity of the cell-specific antenna ports may be 1, 2, or 4. When there is one cell-specific antenna port, the base station configures an antenna port 0 for a cell user. When there are two cell-specific antenna ports, the base station configures an antenna port 0 and an antenna port 1 for a cell user. When there are four cell-specific antenna ports, the base station configures an antenna port 0, an antenna port 1, an antenna port 2, and an antenna port 3 for a cell user. The base station configures a CRS on a resource block based on a configured cell-specific antenna port and a predefined common reference signal pattern corresponding to the cell-specific antenna port, and transmits, to a cell user, the resource block carrying the CRS. In the LTE or LTE-A, an MBSFN reference signal is transmitted on only an antenna port p=4. In the LTE or LTE-A, a UE-specific reference signal or a DMRS may be transmitted on an antenna port p=5, an antenna port p=7, an antenna port p=8, or antenna ports p={7, 8}. A positioning reference signal is transmitted on only an antenna port p=6.

A cell-specific downlink reference signal in the first category may be used for downlink channel quality measurement and downlink channel estimation. Downlink channel estimation is mainly used for coherent detection and demodulation on a UE end.

The base station may be an evolved NodeB (eNB or e-NodeB), a macro base station, a micro base station (or referred to as a "micro base station"), a pico base station, an access point (AP), a transmission point (TP), a gNodeB (new generation NodeB, new generation NodeB), or the like in the LTE system, an NR system, or a licensed-assisted access using long term evolution (Authorized auxiliary access long-term evolution, LAA-LTE) system.

The terminal may be alternatively referred to as UE, a mobile station (Mobile Station, MS), a mobile terminal (Mobile Terminal), an intelligent terminal, or the like. The terminal device may communicate with one or more core networks by using a radio access network (Radio Access Network, RAN). For example, the terminal device may be a mobile phone (or referred to as a "cellular" phone), or a computer having a mobile terminal. The terminal device may be alternatively a portable, pocket-sized, handheld, computer built-in, or in-vehicle mobile apparatus, or a terminal device in a future NR network, and the terminal device exchanges voice and/or data with the radio access network. For description of the terminal device, in this application, the terminal device may alternatively include a relay Relay, and any device that can perform data communication with the base station may be considered as a terminal device. Description is provided in this application by using general UE.

QCL parameters are parameters that are used to represent spatial characteristics and that are introduced based on a need of a 5G beam management technology. There are a plurality of QCL parameters, such as an AoA, a PAS of AoA, an AoD, a PAS of AoD, a receiving antenna spatial correlation, a transmit antenna spatial correlation, receiving beamforming, and transmit beamforming. Physical meanings of the receiving beamforming and the transmit beamforming may be a receive/transmit vector weight corresponding to the receiving/transmit beamforming, where the vector is weighted on a receiving/transmit antenna array; or may be a parameter that can represent a beam characteristic, for example, a beam index, a beam power, or an arrival delay corresponding to the receive/transmit beam.

The AoA represents an angle of arrival of a spatial radio electromagnetic beam when an antenna array receives the electromagnetic beam.

The AoD represents an angle of departure of a spatial radio electromagnetic beam when an antenna array transmits the electromagnetic beam.

The PAS-of-AoA represents an angular spectrum of a radiant power of a spatial radio electromagnetic beam when an antenna array receives the electromagnetic beam. The angular spectrum represents a changing status of a signal power, that is, a distribution status of the signal power in a spatial dimension, with a change of a receiving angle.

The PAS-of-AoD represents an angular spectrum of a radiant power of a spatial radio electromagnetic beam when an antenna array receives the electromagnetic beam. The angular spectrum represents a changing status of a signal power, that is, a distribution status of the signal power in a spatial dimension, with a change of a transmit angle.

The receiving antenna spatial correlation represents a spatial correlation between antenna elements forming a receiving antenna array, and may be described by using a receiving antenna spatial correlation matrix.

The transmit antenna spatial correlation represents a spatial correlation between antenna elements forming a transmit antenna array, and may be described by using a transmit antenna spatial correlation matrix.

The transmit beamforming represents a spatial radio electromagnetic beam transmitted by an antenna array, and may be represented by using a beam ID, a CSI-RS resource ID, or the like, or may be represented by using any parameter value that can represent a receive beam of a receive end, for example, a weight corresponding to the receive beam.

The receiving beamforming represents a spatial radio electromagnetic beam received by an antenna array, and may be represented by using a beam ID, a CSI-RS resource ID, or the like, or may be represented by using any parameter value that can represent a receive beam of a receive end, for example, a weight corresponding to the receive beam.

The spatial filtering may represent transmit/receiving filtering formed by a weighted value on a transmit/receiving antenna array. Alternatively, for a case in which there is a QCL relationship between antenna ports of at least two serving cells, refer to a definition in the LTE. If two antenna ports are considered to be in QCL, large-scale channel information of one antenna port can be inferred from large-scale channel information of the other antenna port. The large-scale channel information includes an average channel gain, a Doppler spread, a Doppler shift, an average delay, and a delay spread.

In addition, if the base station indicates to the UE that there is QCL between two antenna ports about large-scale information used to represent a beam spatial characteristic, a channel spatial characteristic parameter of one antenna port can be inferred from a channel spatial characteristic parameter of the other antenna port, and it indicates that the UE/base station receives reference signals on the two antenna ports by using a same receive beam, or the UE/base station transmits reference signals on the two antenna ports by using a same transmit beam. In addition, in a carrier aggregation (CA) technology, a plurality of CCs may be aggregated into a wider spectrum, and some discontinuous spectrum fragments may also be aggregated, so that a requirement on spectrum compatibility of the LTE system and the LTE-A system can be better met, a standardization process can be accelerated, and existing LTE devices and spectrum resources can be fully used. FIG. 1 is a schematic diagram of carrier aggregation types. In the figure, three types are included: a scenario (a), a scenario (b), and a scenario (c); and each scenario includes a carrier frequency A and a carrier frequency B. In the scenario (a) and the scenario (b), there are several continuous CCs on a same carrier frequency A, it may be considered that radio channels corresponding to the CCs have similar propagation characteristics (have similar propagation delays, propagation paths, beam gains, and the like), and beams can be sent/received by using a same radio frequency link. In this case, it may be assumed that transmit and receive beams on different CCs have similar characteristics. In the scenario (c), if aggregated CCs are discontinuous or a carrier frequency spacing is relatively large, propagation characteristics of radio channels corresponding to the CCs greatly differ. For example, two CCs are respectively on a carrier frequency A and a carrier frequency B, and beams may need to be sent/received by using different radio frequency links (channel delays or beam gains are different). In this case, it is hardly assumed that transmit and receive beams on different CCs have similar characteristics.

Figure 2:
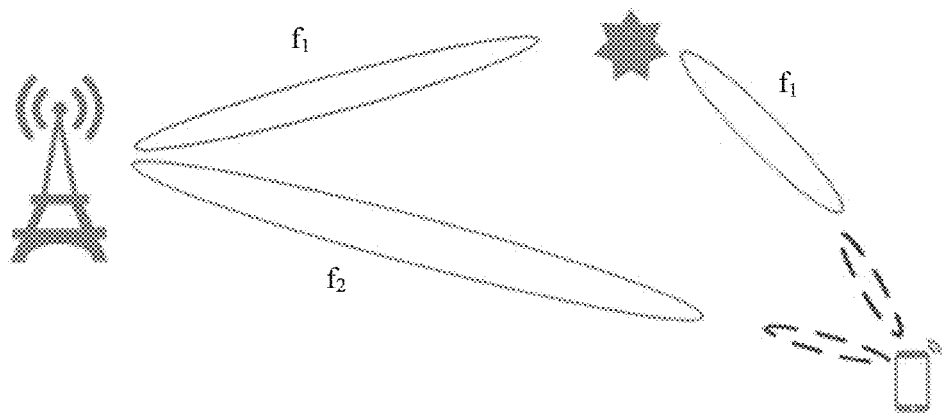
FIG. 2 is a schematic diagram of communicating, by a base station, with a terminal by using two beams.

For example, FIG. 2 is a schematic diagram of communicating, by a base station, with a terminal by using two beams. A frequency of a first component carrier is f1, and a frequency of a second component carrier is f2. As shown in FIG. 2, if a spacing between the frequency f1 and the frequency f2 is relatively large, a channel characteristic of the first component carrier greatly differs from a channel characteristic of the second component carrier. Therefore, directions of optimal beams are different. In this case, it cannot be assumed that there is a QCL relationship between the first component carrier and the second component carrier about large-scale information used to represent a beam spatial characteristic. Dashed lines represent receive/transmit beams of the UE, and solid lines represent transmit/receive beams of the base station. For the base station and the UE, beams indicated by f1 form a beam pair (beam pair), and beams indicated by f2 form another beam pair.

Currently, in a first manner, beam management for each CC is independent, and therefore, it can be determined whether there is a QCL relationship between a plurality of antenna ports of only one CC, and it cannot be learned that there is no QCL relationship between antenna ports of serving cells. However, because an independent beam management process is performed for each CC, a relatively large quantity of pilot resource overheads and signaling overheads need to be consumed. In a second manner, there is a QCL relationship between antenna ports of all CCs about a spatial characteristic parameter. However, in this manner, there is no QCL relationship between antenna ports of CCs having a relatively large frequency spacing about the spatial characteristic parameter, that is, beam characteristics of the CCs are different. If there is no QCL relationship between antenna ports of a CC1 and a CC2, but the base station indicates to the UE that there is a QCL relationship between the antenna ports of the CC2 and the CC1, a transmit and receive beam pair used on the CC2 is inaccurate.

Figure 3A:
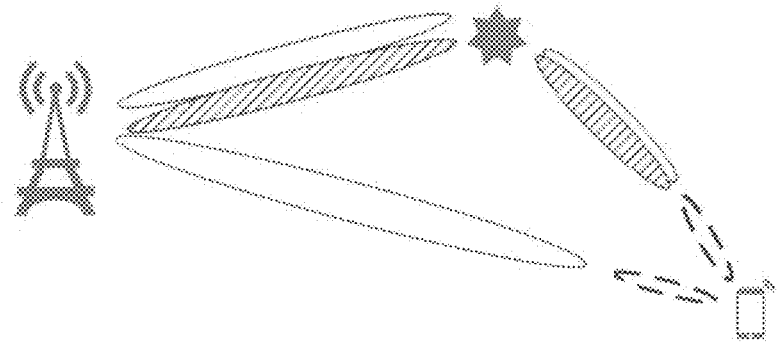
FIG. 3a is a diagram of an embodiment of a communications method according to an embodiment of this application.
Figure 3B:
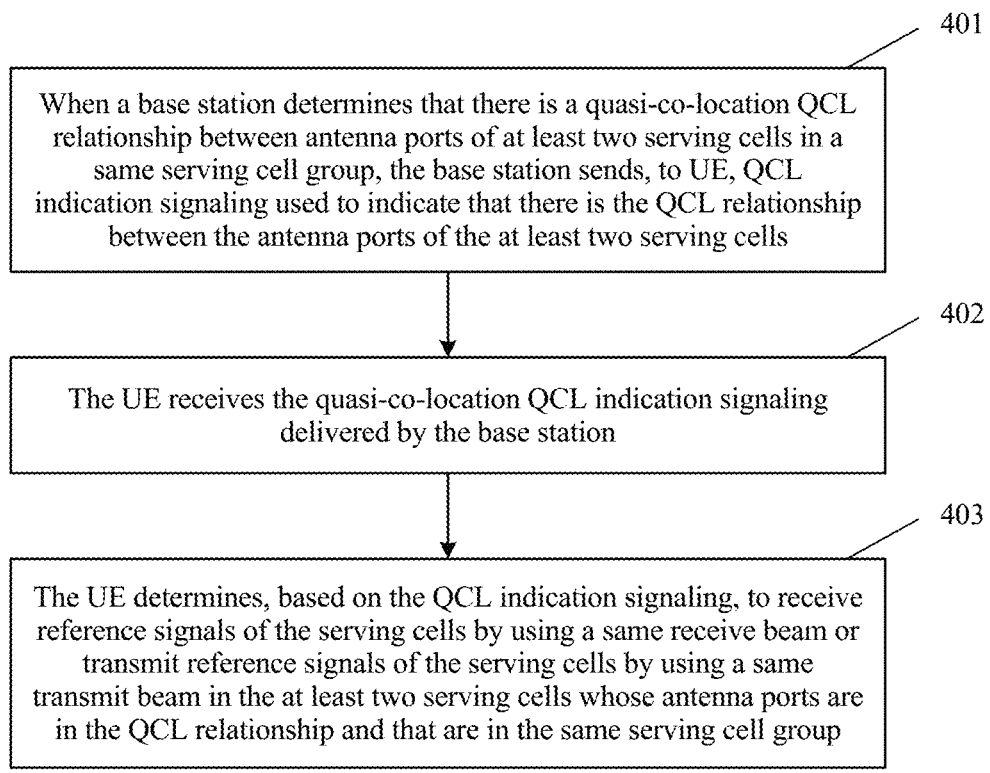
FIG. 3b is a diagram of an embodiment of a communications method according to an embodiment of this application.

In view of this, an embodiment of this application provides a communications method, to resolve the foregoing problem that a relatively large quantity of pilot resource overheads and signaling overheads need to be consumed or a QCL indication is inaccurate. For details, refer to FIG. 3a and FIG. 3b. FIG. 3a is a diagram of an embodiment of a communications method according to an embodiment of this application; and FIG. 3b is a diagram of an embodiment of a communications method according to an embodiment of this application. In FIG. 3a, a base station communicates with a terminal by using three CCs: a CC2 in a filled region, a CC1 above the filled region, and a CC3 below the filled region. It can be learned that the CC1 and the CC2 have similar beam characteristics, for example, propagation directions are the same, and a carrier frequency spacing between the CC1 and the CC2 is not large. Therefore, there is a QCL relationship between antenna ports of the CC1 and the CC2, so that the base station can indicate, to UE by using QCL indication signaling, that transmit and receive beams on the CC2 are the same as transmit and receive beams on the CC1. In the method shown in FIG. 3b, a base station sends, to the UE, QCL indication signaling used to indicate that there is a QCL relationship between antenna ports of at least two serving cells, and the UE determines, based on the QCL indication signaling, that there is the QCL relationship between the antenna ports. The method shown in FIG. 3b may include the following steps.

401. When the base station determines that there is a QCL relationship between antenna ports of at least two serving cells in a same serving cell group, the base station sends, to the UE, QCL indication signaling used to indicate that there is the QCL relationship between the antenna ports of the at least two serving cells.

Optionally, step 401 may be alternatively replaced with the following manner:

The base station sends, to the UE, the QCL indication signaling used to indicate that there is the QCL relationship between the antenna ports of the at least two serving cells, where the serving cells may belong to a same serving cell group, or the serving cells may belong to different serving cell groups and each serving cell group includes one or more serving cells. For example, the base station sends higher layer signaling (RRC signaling or MAC signaling) or physical layer signaling to the UE, to indicate that there is a QCL relationship between DMRS/CSI-RSs of one or more serving cells and a CSI-RS/SS-block of one reference serving cell.

The serving cell group may be obtained in two different manners: In a first manner, the serving cell group is a group predefined according to a preset rule, for example, a predefined grouping manner is directly stipulated in a communication protocol between the base station and the UE; and in a second manner, the serving cell group is obtained after the base station groups serving cells allocated to the user equipment UE.

Optionally, if the serving cell group is obtained in the second manner, the base station delivers information about the serving cell group to the UE by using higher layer signaling or physical layer signaling. In this case, if the serving cell group is obtained after the base station groups the serving cells allocated to the UE, the base station needs to send information about the serving cell group to the UE by using the higher layer signaling, so that the UE learns of the information about the serving cell group serving the UE, and when the base station subsequently notifies the QCL relationship, a selection range is narrowed down when a reference signal is sent by using a serving cell.

In addition, based on this case, the following may be further defined: there is a QCL relationship between antenna ports of serving cells in the same serving cell group. In this manner, when determining the QCL relationship between the antenna ports of the serving cells in the same serving cell group, the base station directly sends a QCL indication according to the rule used to define the same serving cell group.

It should be noted that if CCs in carrier aggregation are continuous or a distance between the CCs is relatively small, it may be considered that there is a QCL relationship between antenna ports of the CCs about one or more of QCL parameters; or if CCs in carrier aggregation are discontinuous or a distance between the CCs is relatively large, it is considered that there is no QCL relationship between antenna ports of the CCs about a QCL parameter. Therefore, if the serving cells are grouped in such a manner that there is a QCL relationship between antenna ports of serving cells in a same serving cell group, in one manner, CCs may be grouped based on a carrier frequency spacing. In addition, different beams correspond to different path transmission delays and different receive powers. Alternatively, CCs may be grouped based on a pointer timing relationship between different CCs.

It should be noted that in carrier aggregation, all CCs of UE are divided into one primary cell (PCell) and a plurality of secondary cells (SCell). Each CC corresponds to one PCell or SCell, and a base station and UE in the PCell are in an RRC connection.

Figure 4:
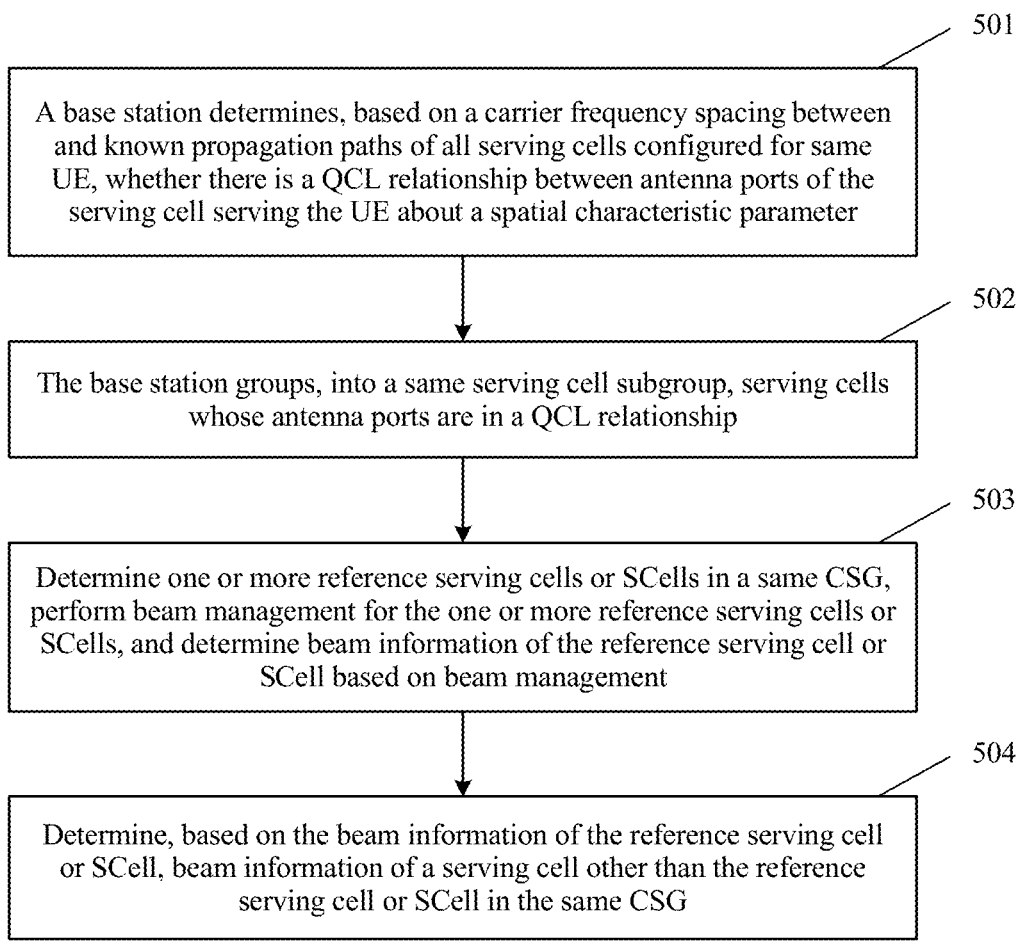
FIG. 4 is a schematic diagram of a subframe timing advance between uplink and downlink subframes.

Optionally, in the first serving cell grouping manner, in addition to a manner of directly grouping N serving cells into M groups, there is another predefinition manner. The following describes this case in this manner. Because different beam paths from different UEs to the base station have different propagation delays, a sending time of an uplink subframe of the UE has a timing advance (TA) relative to a downlink subframe. For details, refer to FIG. 4. FIG. 4 is a schematic diagram of a subframe timing advance between uplink and downlink subframes. A subframe on an upper part is a downlink subframe, and a subframe on a lower part is an uplink subframe. NTA represents a subframe timing advance, and the base station needs to notify the UE of the subframe timing advance by using higher layer signaling. The higher layer signaling is, for example, a medium access control-control element (Medium Access Control-Control Element, MAC-CE) or radio resource control (Radio resource control, RRC). NTA_offset represents an extra uplink subframe timing advance of a time division duplex system relative to a frequency division duplex system. Ts represents a system sampling clock. Based on such a feature, the cells serving the UE may be grouped according to this rule. In other words, the base station groups CCs having a same timing advance NTA into one TAG by pre-estimating a relationship between timing advances of different CCs. Serving cells in a same TAG use a same timing advance and a same timing reference cell. Certainly, in addition to a case in which information about the TAG is predefined for the base station and the UE, the base station may first determine the TAG, and then send the information about the TAG to the UE by using higher layer signaling.

In the first serving cell grouping manner, a manner of directly grouping the N serving cells into the M groups may be specifically directly grouping a CC1, a CC2, a CC3, . . . , and a CCn. For example, a CCs are directly grouped into one serving cell group in sequence. For example, the serving cell group includes three CCs. A serving cell group 1 includes the CC1, the CC2, and the CC3, and a serving cell group 2 includes the CC4, the CC5, and the CC6. This grouping manner may be directly defined by using a protocol. In this manner, the base station does not need to deliver information about a serving cell group to the UE by using higher layer signaling. Certainly, if the grouping manner is not defined by using a protocol, the base station also needs to notify the UE of the information about the serving cell group by using higher layer signaling. Optionally, the NTA may be calculated based on propagation paths that are of different CCs and that are obtained by the base station in advance, or calculated based on a carrier frequency spacing between CCs in carrier aggregation, and CCs having same NTA are grouped into a same TAG Certainly, the base station may configure a plurality of TAGs for the UE by using higher layer signaling. For example, when indicating, to the UE by using higher layer signaling, that one SCell is added, the base station adds a TAG identifier to the SCell, to identify a specific TAG to which the SCell belongs.

It should be noted that if a TAG includes a PCell, the TAG may be referred to as a primary TAG (pTAG); or if a TAG does not include a primary cell, the TAG is referred to as a secondary TAG (sTAG). The pTAG and the sTAG each may include one or more SCells. The UE considers that CCs in one TAG have a same subframe timing advance and a same timing reference cell.

Optionally, the serving cells may be further grouped in the following manner: The base station performs grouping based on a numerology used by the serving cells. For example, serving cells having a same numerology are grouped into one serving cell group, or serving cells having a plurality of numerologies are grouped into one serving cell group. A grouping manner may be fixed, or may be configured by using higher layer signaling. For example, a subcarrier spacing configuration parameter may include 15 kHz, 30 kHz, 60 kHz, 120 kHz, 240 kHz, or 480 kHz. In an example, the base station may group serving cells having subcarrier spacings of 15 kHz, 30 kHz, and 60 kHz into one group, and group serving cells having subcarrier spacings of 120 kHz, 240 kHz, and 480 kHz into another group. Alternatively, the base station notifies the UE of a numerology by using higher layer signaling (for example, RRC signaling or a MAC-CE), where serving cells having the numerology are in a same serving cell group, or the base station notifies, by using higher layer signaling (for example, RRC signaling or a MAC-CE), the UE that at least one serving cell group includes serving cells having at least one type of numerology. Serving cells having a same numerology may be alternatively grouped into a plurality of different serving cell groups. In the foregoing method for grouping serving cells based on a TAG or a numerology, each serving cell group includes at least one serving cell. The serving cell group may be predefined. For example, a quantity of serving cell groups, and/or a quantity of serving cells in each serving cell group, and/or an identifier or a configuration parameter of a BWP/CC in each group may be pre-stipulated. Alternatively, the base station may configure information about a serving cell group for a user by using higher layer signaling. For example, the information about the serving cell group may represent, in a form of a bitmap, information about a serving cell included in at least one serving cell group, and/or a quantity of serving cell groups, and/or a quantity of serving cells in each serving cell group, and/or identifiers or configuration parameters of one or more serving cells in each group, and/or a serving cell group in which one or more serving cells are located.

Optionally, the base station configures, by using higher layer signaling, a serving cell group to which one or more serving cells belong (for example, an identifier of a serving cell group to which one or more serving cells belong may be indicated), and/or indicates a QCL parameter (for example, at least one of an average delay, a delay spread, a Doppler spread, a Doppler shift, an average channel gain, and a spatial parameter) corresponding to the serving cell group, and/or information about antenna ports that correspond to a QCL relationship and that are in different serving cells, or information about an antenna port combination corresponding to a QCL relationship, or information about different types of reference signals corresponding to a QCL relationship (for example, indicating a QCL relationship between a CSI-RS and a DMRS, between an SS block and a DMRS, between an SS block and a CSI-RS, or between a CSI-RS and a CSI-RS). Table 1 provides an example.

TABLE 1

| Group number | ID of a cell in a group | QCL parameter corresponding to a group |
|---|---|---|
| Group 1 | Serving cell ID 1, and serving cell ID 2 | Spatial parameter |
| Group 2 | Serving cell ID 3, serving cell ID 4, and serving cell ID 5 | Spatial parameter |
| Group 3 | Serving cell ID 6 | Average delay and Doppler spread |
| ... | ... | ... |

The foregoing describes grouping performed by using different grouping manners. The following describes a QCL relationship between antenna ports of at least two serving cells in a same group. In this embodiment of this application, there are at least three manners of determining the QCL relationship between the antenna ports of the at least two serving cells in the same group. The three manners are described below.

In a first QCL determining manner, it is directly determined that there is a QCL relationship between antenna ports of at least two serving cells in a same serving cell group. In this case, the base station can directly determine the QCL relationship between the antenna ports of the at least two serving cells in the same serving cell group based on the determining manner, generate a corresponding QCL indication, and send the QCL indication to the UE.

In a second QCL determining manner, the base station sends measurement pilots by using beams of serving cells. Description is provided by using two serving cells in a same serving cell group as an example, and QCL between antenna ports of at least two serving cells may be obtained by analogy. In this manner, the base station first sends measurement pilots to the UE by using beams of two serving cells in a same serving cell group. After receiving the measurement pilots, the UE first determines, based on the beams of the two cells, a QCL determining indication or a beam ID having target channel quality. Specifically, the base station tests beams in various directions for measurement pilots received on two CCs, selects a beam ID or a QCL determining indication having relatively high channel quality in the beams, and sends the beam ID or the QCL determining indication to the base station, so that the base station can determine, based on the beam ID or the QCL determining indication, whether there is a QCL relationship between antenna ports of serving cells corresponding to the two CCs.

The QCL determining indication is a determining bit that is obtained by the UE through estimation and that is used to indicate whether transmit/receive beams on the two CCs meet QCL between spatial parameters.

It should be noted that in addition to feeding back a QCL relationship between antenna ports of serving cells corresponding to two CCs in a same TAG the beam ID or the QCL determining indication of the UE may be further used to feed back a QCL relationship between antenna ports of serving cells corresponding to CCs in different TAGs. To be specific, in this embodiment of this application, not only the QCL relationship between the antenna ports of the serving cells in the same TAG can be determined, but also the QCL relationship between the antenna ports of the serving cells in the different TAGs can be determined. After determining is completed, the QCL relationship is sent to the UE by using QCL indication signaling. Determining for the same TAG and the different TAGs can further reduce pilot and feedback overheads of beam management. Certainly, in this embodiment of this application, only the QCL relationship between the antenna ports of the serving cells in the different TAGs may be determined, and the QCL relationship between the antenna ports of the two serving cells in the same TAG is not determined. In this case, pilot and feedback overheads of beam management can also be reduced to some extent.

In a third manner, the base station determines, based on a carrier frequency spacing between or propagation paths of component carriers corresponding to the at least two serving cells, that there is a QCL relationship between antenna ports of at least two serving cells. This manner may also be used for TAG grouping. When the QCL relationship is determined in this manner, determining may be performed by using one of a carrier frequency spacing and a propagation path, or determining may be performed by combining a carrier frequency spacing and a propagation path. In a manner of performing determining by using a carrier frequency spacing, if a carrier frequency spacing between two CCs in a same serving cell group is relatively small, it may be considered that antenna ports of serving cells corresponding to the two CCs have some same spatial characteristic parameters. Therefore, it may be considered that there is a QCL relationship between the antenna ports of the serving cells corresponding to the two CCs. When determining is performed by using a propagation path, because for a same propagation path, the two CCs have basically same NTA, and beams having a same transmit direction may be used because propagation paths are the same. Therefore, it may be considered that there is a QCL relationship between the antenna ports of the serving cells corresponding to the two CCs.

402. The UE receives the quasi-co-location QCL indication signaling delivered by the base station.

After generating the QCL indication signaling, the base station delivers the QCL indication signaling to the UE. The UE receives the QCL indication signaling, and can learn, by using the QCL indication signaling, of whether there is a QCL relationship between antenna ports of at least two serving cells in a same serving cell group, or whether there is a QCL relationship between antenna ports of serving cells in different serving cell groups. Certainly, when the QCL indication signaling indicates that there is the QCL relationship between the antenna ports of the at least two serving cells in the same serving cell group and that there is the QCL relationship between the antenna ports of the serving cells in the different serving cell groups, the UE sends reference signals based on the two cases. The QCL indication signaling may be delivered by using higher layer signaling, or may be delivered by using physical layer signaling, or may be sent by using both higher layer signaling and RRC signaling.

Optionally, the QCL indication signaling may indicate an antenna port (for example, a CSI-RS or a DMRS) of at least one serving cell in a same serving cell group and/or another serving cell group, and/or QCL parameters of the antenna port set that are in a QCL relationship (for example, there is a QCL relationship about a spatial characteristic parameter, a Doppler spread, and an average delay of an SS block, or there is a QCL relationship about a spatial parameter of a CSI-RS).

403. The UE determines, based on the QCL indication signaling, to receive reference signals of the serving cells by using a same receive beam or transmit reference signals of the serving cells by using a same transmit beam in the at least two serving cells whose antenna ports are in the QCL relationship and that are in the same serving cell group.

If the following is predefined in a protocol: there is a QCL relationship between antenna ports of at least two serving cells in a same TAG and there is no QCL relationship between antenna ports of serving cells in different TAGs, the UE may understand that signals on the antenna ports may be received by using a same receive beam in the serving cells in the same TAG Therefore, the base station and the UE only need to perform beam management for a CC corresponding to one serving cell, so that beam scanning pilot overheads and beam feedback overheads on the other CC are reduced.

For example, after receiving the QCL indication signaling indicated by the base station, the UE understands that a base station transmit beam of a CSI-RS on a CC2 is also used to send a CSI-RS (or a DMRS) on a CC1, so that the UE receives a signal of an antenna port of the CC1 by using a receive beam the same as a receive beam used to receive, on the CC2, a CSI-RS port for beam management. Therefore, a beam management process for the CC2 can be omitted, so that pilot overheads and beam feedback overheads of beam management are reduced.

It can be learned that in the method in the embodiment shown in FIG. 4, because the serving cells serving the UE are grouped into the serving cell groups in advance, and the QCL relationship between the antenna ports of the at least two serving cells in the same serving cell group is determined, when it is determined that there is the QCL relationship between the antenna ports of the at least two serving cells, the QCL relationship is indicated to the UE by using the QCL indication signaling, so that the base station does not need to perform beam management on a beam corresponding to each serving cell, and only needs to separately perform beam management for serving cells whose antenna ports are not in a QCL relationship, and performs beam management for only one of serving cells whose antenna ports are in a QCL relationship, thereby reducing pilot and feedback overheads in a beam management process.

It should be noted that in step 401 to step 403 in the embodiment shown in FIG. 4, in addition to a case in which the QCL relationship between the antenna ports of the at least two serving cells in the same serving cell group is determined and used, the QCL relationship between the antenna ports of the serving cells in the different serving cell groups may be further determined and used. For example, for different TAGs, after the UE initially accesses the base station, the base station may perform independent beam management for different TAGs. The beam management process is similar to that in the second determining manner of determining the QCL relationship between the antenna ports of the at least two serving cells. In other words, after the base station transmits different beams by using measurement pilots, the UE feeds back, to the base station, a beam ID/QCL determining indication having relatively high channel quality. The base station determines, by comparing beam IDs/QCL determining indications fed back on different TAGs, whether there is a QCL relationship between antenna ports of serving cells in different TAGs. Subsequently, the base station can send the QCL relationship between the antenna ports of the serving cells in the different serving cell groups to the UE in a manner of a QCL indication, so that the UE can determine to receive reference signals of the serving cells by using a same receive beam or transmit reference signals of the serving cells by using a same transmit beam in the serving cells whose antenna ports are in the QCL relationship and that are in the different serving cell groups.

Specifically, similar to step 401 to step 403, when the QCL relationship between the antenna ports of the serving cells in different serving cells is determined and used, In this example, step 401 in the embodiment shown in FIG. 4 may be changed to the following step: When the base station determines that there is the QCL relationship between the antenna ports of the serving cells in the different serving cell groups, the base station sends, to the UE, QCL indication signaling used to indicate that there is the QCL relationship between the antenna ports of the serving cells in the different groups.

For this step, there are two serving cell grouping manners, similar to the two serving cell grouping manners in the embodiment shown in FIG. 4. However, when serving cells are grouped, it is not preferentially considered whether there is a QCL relationship between antenna ports of serving cells in a same serving cell group. In addition, if the second serving cell grouping manner is used, when the base station groups the serving cells, the base station also needs to deliver information about a serving cell group by using higher layer signaling. In addition, there are two QCL relationship determining manners in this step, and the two manners are the same as those in the embodiment shown in FIG. 4, namely, the second QCL relationship determining manner and the third QCL relationship determining manner in the embodiment shown in FIG. 4. For a first QCL relationship determining manner, in this step, the following may be predefined: there is a QCL relationship between antenna ports in different serving cell groups. This manner is different from the first QCL relationship determining manner in the embodiment shown in FIG. 4 in which the following is predefined: there is the QCL relationship between the antenna ports in the same serving cell group.

Step 402 in the embodiment shown in FIG. 4 may remain unchanged in this example, but content of received QCL indication signaling changes. In other words, the QCL indication signaling is used to indicate that there is the QCL relationship between the antenna ports of the serving cells in the different serving cell groups.

Step 403 in the embodiment shown in FIG. 4 may be changed to the following step: The UE determines, based on the QCL indication signaling, to receive reference signals of the serving cells by using a same receive beam or transmit reference signals of the serving cells by using a same transmit beam in the serving cells whose antenna ports are in the QCL relationship and that are in the different serving cell groups. Similar to the description of step 403 in the embodiment shown in FIG. 4, if the following is predefined in a protocol: there is the QCL relationship between the antenna ports of the serving cells in the different TAGs, the UE understands that signals on antenna ports may be received by using a same receive beam on CCs in the different TAGS. Therefore, the base station and the UE only need to perform a beam management process for one CC, so that beam scanning pilot overheads and beam feedback overheads on the other CC are reduced.

In addition, for the serving cells serving the UE, in addition to a case in which only the QCL relationship between the antenna ports of the at least two serving cells in the same serving cell group is determined and used, or that only the QCL relationship between the antenna ports of the serving cells in the different serving cell groups is determined and used, both the QCL relationship between the antenna ports of the at least two serving cells in the same serving cell group and the QCL relationship between the antenna ports of the serving cells in the different serving cell groups may be determined and used, so that pilot overheads and beam feedback overheads of beam management can be further reduced.

The following describes the foregoing grouping manners and QCL indications in this embodiment of this application by using several actual examples.

(1) There is a QCL relationship between antenna ports of all SCells and a PCell or a PSCell in a pTAG The PSCell means that there are two carrier groups (CG) in a dual connectivity technology, and each CG is connected to different base stations, where one CG is referred to as a primary CG the other CG is referred to as a secondary CG the primary CG and the secondary CG each include one PCell, and the PCell in the secondary CG is referred to as a PSCell. It can be learned that in this case, two base stations are actually included, and each UE is connected to the two base stations by using the dual connectivity technology.

In this example, if the base station determines that antenna ports of at least two serving cells in one pTAG have at least one same parameter in a spatial characteristic parameter or have a same average channel gain, the base station may notify, by using higher layer signaling, the UE that there is a QCL relationship between an antenna port (or an antenna port of a DMRS used for data demodulation) in a CSI-RS resource used for beam management or channel state information measurement in all SCells in the pTAG and an antenna port in a CSI-RS resource used for beam management or channel state information measurement in a PCell or a PSCell about an average channel gain or at least one spatial characteristic parameter. After receiving the QCL indication signaling, the UE receives a CSI-RS (or a DMRS) in another SCell in the same pTAG by using a receive beam of a CSI-RS in the PCell or the PSCell, so that a beam management process in the another SCell can be omitted, thereby reducing beam scanning pilot overheads and beam feedback overheads.

If the base station determines that antenna ports of serving cells in one pTAG have at least one same parameter in a spatial characteristic parameter or have a same average channel gain, the base station may notify, by using QCL indication signaling, the UE that there is a QCL relationship between an antenna port (or a port of a DMRS used for data demodulation) in a CSI-RS resource used for beam management or channel state information measurement in all SCells in the pTAG and an antenna port in a CSI-RS resource used for beam management or channel state information measurement in a PCell or a PSCell about an average channel gain or at least one spatial characteristic parameter. After receiving the higher layer signaling, the UE understands that a base station transmit beam of a CSI-RS in the PCell is also used to send a CSI-RS (or a DMRS) in another SCell in the same pTAG, so that the UE receives, in the another SCell, the CSI-RS (or the DMRS) in the another SCell in the same pTAG by using a receive beam of the CSI-RS in the PCell or the PSCell. Therefore, a beam management process in the another SCell can be omitted, so that beam scanning pilot overheads and beam feedback overheads are reduced.

(2) There may be a QCL relationship between antenna ports of each SCell and a PCell or a PSCell in a pTAG The base station independently configures whether there is a QCL relationship between antenna ports of each SCell and the PCell of the UE, and delivers the QCL relationship between the antenna ports of each SCell and the PCell or the PSCell in the pTAG to the UE by using higher layer signaling or physical layer signaling.

This example is the same as (1). An only difference is that the base station needs to determine serving cells whose antenna ports are in a QCL relationship and that are in one pTAG and notify the UE of an SCell by using higher layer signaling (for example, RRC or a MAC-CE) or physical layer signaling (DCI), where there is a QCL relationship between an antenna port (or a port of a DMRS used for data demodulation) in a CSI-RS resource used for beam management or channel state information measurement in the SCell in the pTAG and an antenna port in a CSI-RS resource used for beam management or channel state information measurement in the PCell or the PSCell about an average channel gain or at least one spatial characteristic parameter. For example, a format of the higher layer signaling/physical layer signaling may be a bitmap (bitmap), and a quantity of bits is the same as a quantity of the SCells in the pTAG Specifically, if there are four serving cells in one pTAG, 1001 indicates that there is a QCL relationship between antenna ports of a first SCell and a fourth SCell and an antenna port of a PCell. Alternatively, a piece of information may be added to higher layer signaling used to add each SCell in a TAG, to describe a QCL relationship between antenna ports of the SCell and the PCell.

(3) There is a QCL relationship between antenna ports of SCells in a same sTAG

In this example, the sTAG does not include a PCell, and a reference SCell may be defined for each sTAG (the reference SCell may be referred to as a serving cell or an SCell C).

If the base station determines that antenna ports of serving cells in one sTAG have at least one same parameter in a spatial characteristic parameter or have a same average channel gain, the base station may notify, by using higher layer signaling, the UE that there is a QCL relationship between antenna ports (or ports of DMRSs used for data demodulation) in CSI-RS resources used for beam management or channel state information measurement in all SCells in the sTAG, or that there is a QCL relationship between antenna ports in CSI-RS resources used for beam management or channel state information measurement in all SCells in the same sTAG and a serving cell or an SCell C about at least one parameter in a spatial characteristic parameter or an average channel gain. After receiving the higher layer signaling, the UE receives a CSI-RS (or a DMRS) in another SCell in the same pTAG by using a receive beam of a CSI-RS in the serving cell or the SCell C, so that a beam management process in the another SCell can be omitted, thereby reducing beam scanning pilot overheads and beam feedback overheads.

If the base station determines that antenna ports of serving cells in one sTAG have at least one same parameter in a spatial characteristic parameter or have a same average channel gain, the base station may notify, by using higher layer signaling, the UE that there is a QCL relationship between antenna ports (or ports of DMRSs used for data demodulation) in CSI-RS resources used for beam management or channel state information measurement in all SCells in the same sTAG, or that there is a QCL relationship between antenna ports in CSI-RS resources used for beam management or channel state information measurement in all SCells in the same sTAG and a serving cell or an SCell C about at least one parameter in a spatial characteristic parameter or an average channel gain. After receiving the higher layer signaling, the UE understands that a base station transmit beam of a CSI-RS in the serving cell or the SCell C is also used to send a CSI-RS (or a DMRS) in another SCell in the same sTAG, so that the UE receives, in the another SCell, the CSI-RS (or the DMRS) in the another SCell in the same pTAG by using a receive beam of the CSI-RS in the serving cell or the SCell. Therefore, a beam management process in the another SCell can be omitted, so that beam scanning pilot overheads and beam feedback overheads are reduced.

(4) There may be a QCL relationship between antenna ports of SCells in a same pTAG or sTAG The base station may independently configure whether there is a QCL relationship between antenna ports of SCells, and deliver the QCL relationship to the UE by using higher layer signaling or physical layer signaling.

This example is the same as (3). An only difference is that one or more reference SCells (which may be marked as a serving cell, or an SCell C1, or an SCell C1, an SCell C2, an SCell C3, . . . ) are defined for each sTAG or pTAG Optionally, the base station indicates at least one parameter of the one or more reference SCells by using higher layer signaling, for example, a quantity of the SCells, an ID of the SCell, information about an antenna port of the SCell, and corresponding QCL parameter information. After determining serving cells whose antenna ports are in a QCL relationship and that are in one pTAG or sTAG, the base station notifies the UE of an SCell by using higher layer signaling or physical layer signaling, where there is a QCL relationship between an antenna port (or a port of a DMRS used for data demodulation) in a CSI-RS resource used for beam management or channel state information measurement in the SCell and an antenna port in a CSI-RS resource used for beam management or channel state information measurement in a reference SCell whose ID is the serving cell or the SCell C1 about at least one parameter in a spatial characteristic parameter or an average channel gain. Alternatively, the base station notifies, by using higher layer signaling or physical layer signaling, the UE that there is a QCL relationship between an antenna port in a CSI-RS resource used for CSI measurement in each SCell and an antenna port in a CSI-RS resource used for CSI measurement in a reference serving cell whose ID is the SCell C1, the SCell C2, or the SCell C3 or in an SCell about at least one parameter in a spatial characteristic parameter or an average channel gain. For example, Table 2 shows that physical layer signaling of each CC is used to notify the UE of a reference SCell, where there is a QCL relationship between an antenna port of a serving cell corresponding to the CC and an antenna port of the reference SCell.

TABLE 2

| DCI bit | Meaning of the DCI bit |
|---|---|
| 00 | There is a QCL relationship with an antenna port in a CSI-RS resource used for beam management or channel state information measurement in a reference SCell C1 (higher layer signaling may be used to configure information about the CSI-RS). |
| 01 | There is a QCL relationship with an antenna port in a CSI-RS resource used for beam management or channel state information measurement in a reference SCell C2 (higher layer signaling may be used to configure information about the CSI-RS). |
| 10 | There is a QCL relationship with a CSI-RS resource used for beam management or channel state information measurement in a reference SCell C3 (higher layer signaling may be used to configure information about the CSI-RS). |
| 11 | There is a QCL relationship with an antenna port in a CSI-RS resource used for beam management or channel state information measurement in a reference SCell C4 (higher layer signaling may be used to configure information about the CSI-RS). |

Figure 5:
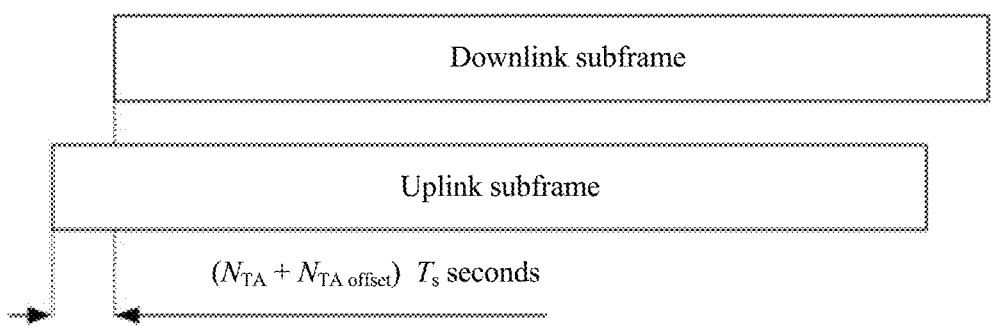
FIG. 5 is a diagram of an embodiment of a communications method according to an embodiment of this application.

The foregoing describes, by using an example in which grouping is performed based on a TAG or a numerology, a case of determining a QCL relationship between antenna ports of serving cells in a same TAG or different TAGs in this embodiment of this application. The following describes a QCL relationship between antenna ports of serving cells in a same serving cell group or different serving cell groups when grouping is performed in a non-TAG manner. FIG. 5 is a diagram of an embodiment of a communications method according to an embodiment of this application. In this embodiment, a base station directly groups all serving cells serving UE, indicates information about the serving cell group to the UE by using higher layer signaling, and then sends a QCL relationship between antenna ports of serving cells in the same serving cell group to the UE by using QCL indication signaling. The communications method may include the following steps.

501. The base station determines, based on a carrier frequency spacing between and propagation paths of CCs corresponding to all serving cells configured for same UE, whether there is a QCL relationship between antenna ports of the serving cells serving the UE about a spatial characteristic parameter.

Optionally, in step 501, the base station may alternatively determine, based on numerology information or TA information of different serving cells, whether there is the QCL relationship between the antenna ports of the serving cells serving the UE about the spatial characteristic parameter.

A manner of determining a QCL relationship by using the carrier frequency spacing and the propagation paths in this step is similar to the third QCL relationship determining manner in the embodiment shown in FIG. 3*b*, and details are not described herein again.

Optionally, in this embodiment of the present invention, the UE may feed back a serving cell grouping capability of the UE to assist the base station in determining a grouping manner. For example, the UE may have a plurality of radio frequency RF receive/transmit links, to receive/send signals in different serving cells. There may be no QCL relationship between serving cells on different RF links, and therefore, the serving cells belong to different serving cell groups.

Optionally, after the UE initially accesses the base station, the base station may perform independent beam management for different serving cells. In other words, after the base station transmits measurement pilots by using beams of different serving cells, the UE feeds back a beam ID/QCL determining indication having relatively high channel quality to the base station. The base station determines, by comparing beam IDs/QCL determining indications fed back in different serving cells, whether there is a QCL relationship between antenna ports of the different serving cells. In this embodiment, the QCL determining indication is a determining bit that is obtained by the UE through estimation and that is used to indicate whether transmit beams or receive beams in two serving cells meet QCL between spatial parameters. For example, the QCL determining indication may indicate at least one of the following information: information about a quantity of serving cell groups supported by the UE, a quantity of serving cells supported in each group, an ID or a configuration parameter of at least one serving cell group, an ID or a configuration parameter of a serving cell in the at least one serving cell group, and at least one of a reference signal received power (Reference Signal Receiving Power, RSRP), an average delay, a delay spread, a Doppler spread, Doppler shift, and the like of at least one antenna port (for example, a CSI-RS antenna port) of at least one serving cell. Alternatively, the QCL determining indication includes a serving cell group to which a serving cell/BWP/CC of the UE belongs (for example, an ID of the serving cell group to which the BWP/CC belongs is reported).

Optionally, the base station triggers feedback of the QCL determining indication by using higher layer signaling (for example, RRC signaling or a MAC-CE) or physical layer signaling, or the base station triggers, in at least one of the following cases, the UE to feed back the QCL determining indication.

(1) At least one serving cell is activated, added, configured, deactivated, or deleted.

(2) At least one numerology of a serving cell is activated, added, configured, deactivated, or deleted.

(3) A first timer expires or has expired, and a channel condition obtained by the UE end through measurement quickly changes (for example, a beam failure (beam failure) occurs or beam quality/RSRP is less than a threshold). Duration of the first timer is a default value, or configuration is triggered by RRC layer signaling or MAC layer signaling.

(4) Timing duration of a second timer expires. The duration of the second timer is a default value, or configuration is triggered by RRC layer signaling or MAC layer signaling.

502. The base station groups, into a same serving cell subgroup, serving cells whose antenna ports are in a QCL relationship.

If there are n serving cells, which are respectively marked as a serving cell 1, a serving cell 2, a serving cell 3, . . . , and a serving cell n, the serving cells may be grouped into m serving cell subgroups (CC subgroup (CSG)) or serving cell groups based on the QCL relationship determined in step 501. The base station may send information about the m serving cell subgroups or serving cell groups to the UE by using higher layer signaling. For example, the information about the serving cell group may represent, in a form of a bitmap, at least one of the following information: information about a serving cell included in at least one serving cell group, a quantity of the serving cell groups, a quantity of BWP/CCs in each serving cell group, identifiers or configuration parameters of one or more BWP/CCs in each group, and a serving cell group in which one or more BWP/CCs are located.

Optionally, the base station may indicate a grouping manner by using higher layer signaling. For example, when the signaling is set to "mode 1", the UE may be notified that the serving cells are grouped in a predefinition manner (for example, grouping is performed based on a TAG, or serving cells having a same numerology are grouped into one serving cell group), and when the signaling is set to "mode 2", the UE may be notified that the base station notifies information about a serving cell group by using higher layer signaling or physical layer signaling, and/or that UE needs to feed back a QCL determining indication.

There is a QCL relationship between antenna ports of serving cells in a same CSG The QCL relationship may be predefined; that is, the following may be predefined: there is a QCL relationship between antenna ports of all serving cells in one CSG about at least one parameter in a spatial characteristic parameter or an average channel gain. Certainly, the following may be alternatively predefined: there is no QCL relationship between antenna ports of serving cells in different CSGs about at least one parameter in a spatial characteristic parameter or an average channel gain. Subsequently, the base station may indicate the QCL relationship between the antenna ports of the serving cells in the same CSG to the UE by using higher layer signaling, and when different CSGs are defined, indicate, to the UE, that there is no QCL relationship between the antenna ports of the serving cells in the different CSGs.

503. Determine one or more reference serving cells or SCells in a same CSG, perform beam management for the one or more reference serving cells or SCells, and determine beam information of the reference serving cell or SCell based on beam management.

One reference serving cell or SCell may be marked as a SCell C1, and when there are a plurality of reference serving cells or SCells, for example, m reference serving cells or SCells, the reference serving cells or SCells are respectively marked as an SCell C1, an SCell C2, an SCell C3, . . . , and an SCell Cm. A quantity of the reference serving cells or SCells may be predefined by using a protocol, or may be determined by the base station and then indicated to the UE by using higher layer signaling.

504. Determine, based on the beam information of the reference serving cell or SCell, beam information of a serving cell other than the reference serving cell or SCell in the same CSG.

Because the reference serving cell or SCell is a serving cell specified for reference, the base station may determine a QCL relationship between an antenna port of each serving cell in the CSG and an antenna port of the reference serving cell or SCell, and when there is the QCL relationship, deliver the QCL relationship to the UE by using QCL indication signaling.

The foregoing method may further include the following step: The base station sends, to the UE, QCL indication signaling used to indicate that there is a QCL relationship between antenna ports of at least two serving cells, where the serving cells may belong to a same serving cell group, or the serving cells may belong to different serving cell groups and each serving cell group includes at least one serving cell. For example, the base station sends higher layer signaling (RRC or MAC signaling) or physical layer signaling to the UE, to indicate that there is a QCL relationship between DMRS/CSI-RSs of one or more serving cells and a CSI-RS/SS-block of one reference serving cell. The QCL indication signaling may be delivered by using higher layer signaling, or may be delivered by using physical layer signaling, or may be sent by using both higher layer signaling and RRC signaling.

For example, if one CSG includes only one reference serving cell or SCell, the following may be predefined in a protocol: there is a QCL relationship between an antenna port of a serving cell other than the reference serving cell or SCell in the same CSG and an antenna port of the reference serving cell or SCell about at least one parameter in the spatial characteristic parameter or the average channel gain.

Alternatively, the base station indicates M groups of parameters by using higher layer signaling. Each group of parameters includes antenna port information from a serving cell 1, a serving cell 2, a serving cell 3, . . . , and a serving cell m, for example, CSI-RS resource configuration information of the serving cell 1, the serving cell 2, the serving cell 3, . . . , and the serving cell m.

For a serving cell other than the reference serving cell or SCell in the same CSG, the base station may indicate, by using higher layer signaling, that there is a QCL relationship between an antenna port (or an antenna port of a DMRS used for data demodulation) of a CSI-RS used for beam management or CSI measurement in the serving cell and an antenna port of a CSI-RS used for beam management or CSI measurement in one of the serving cell 1, the serving cell 2, the serving cell 3, . . . , and the serving cell m about at least one parameter in the spatial characteristic parameter or the average channel gain. For example, for each serving cell, the base station may notify the UE of a reference serving cell or SCell by using physical layer signaling (DCI), where there is a QCL relationship between an antenna port of the serving cell and an antenna port of the reference serving cell or SCell. A format of the DCI may be shown in Table 3.

TABLE 3

| DCI bit | Meaning of the DCI bit |
| --- | --- |
| 00 | There is a QCL relationship with an antenna port in a CSI-RS resource used for beam management or channel state information measurement in a reference serving cell or an SCell C1 (higher layer signaling may be used to configure information about the CSI-RS). |
| 01 | There is a QCL relationship with an antenna port in a CSI-RS resource used for beam management/channel state information measurement in a reference serving cell or an SCell C2 (higher layer signaling may be used to configure information about the CSI-RS). |
| 10 | There is a QCL relationship with an antenna port in a CSI-RS resource used for beam management/channel state information measurement in a reference serving cell or an SCell C3 (higher layer signaling may be used to configure information about the CSI-RS). |
| 11 | There is a QCL relationship with an antenna port in a CSI-RS resource used for beam management/channel state information measurement in a reference serving cell or an SCell C4 (higher layer signaling may be used to configure information about the CSI-RS). |

The foregoing method may further include the following step: The base station notifies, by using higher layer signaling or physical layer signaling, the UE that there is a QCL relationship between antenna ports of one or more serving cells and an antenna port of the reference serving cell.

In this embodiment of the present invention, optionally, one or more reference SCells (which may be marked as an SCell C1, or an SCell C1, an SCell C2, an SCell C3, . . . ) are defined. Optionally, the base station indicates at least one parameter of the one or more SCells by using higher layer signaling, for example, a quantity of the SCells, an ID of the SCell, information about an antenna port of the SCell, and corresponding QCL parameter information. The base station may notify, by using physical layer signaling, the UE that there is a QCL relationship between a CSI-RS antenna port (or a port of a DMRS used for data demodulation) of at least one serving cell in one or more serving cell groups and a CSI-RS antenna port (or a time-frequency resource corresponding to an SS block) of the SCell C1 (or one of the SCell C1, the SCell C2, and the SCell C3). For example, the base station configures one or more serving cell groups (marked as a CSG 1, or a CSG 1, a CSG 2, . . . ) by using higher layer signaling, or configures at least one serving cell by using higher layer signaling. The at least one serving cell may be in a same serving cell group, or different serving cell groups. The physical layer signaling may include one or more indication fields, to indicate a reference SCell, where there is a QCL relationship between an antenna port of the one or more serving cell groups configured by using the higher layer signaling and an antenna port of the reference SCell, or indicate a reference SCell, where there is a QCL relationship between an antenna port of the at least one serving cell configured by using the higher layer signaling and an antenna port of the reference SCell. For example, the base station may notify the UE of a reference SCell by using a physical layer signaling indication field shown in Table 4, where there is a QCL relationship between an antenna port of the CSG 1 or the CSG 1, the CSG 2, . . . and an antenna port of the reference SCell. The base station may instruct the UE to implement the foregoing definition process.

TABLE 4

| DCI bit | Information indicated by the DCI bit |
| --- | --- |
| 00 | There is a QCL relationship with an antenna port in a CSI-RS resource used for beam management or channel state information measurement in a reference SCell C1 (higher layer signaling may be used to configure information about the CSI-RS). |
| 01 | There is a QCL relationship with an antenna port in a CSI-RS resource used for beam management or channel state information measurement in a reference SCell C2 (higher layer signaling may be used to configure information about the CSI-RS). |
| 10 | There is a QCL relationship with an antenna port in a CSI-RS resource used for beam management or channel state information measurement in a reference SCell C3 (higher layer signaling may |

TABLE 4-continued

| DCI bit | Information indicated by the DCI bit |
|---|---|
| | be used to configure information about the CSI-RS). |
| 11 | There is a QCL relationship with an antenna port in a CSI-RS resource used for beam management or channel state information measurement in a reference SCell C4 (higher layer signaling may be used to configure information about the CSI-RS). |

It can be learned that for the serving cells serving the UE, it is determined, based on a carrier frequency spacing and known propagation paths, whether there is a QCL relationship between antenna ports of all serving cells about a spatial characteristic parameter; then, serving cells whose antenna ports are in a QCL relationship are grouped into serving cell subgroups; then one or more reference serving cells or SCells are selected from each serving cell subgroup, beam management is performed for the one or more reference serving cells or SCells, and beam information of the reference serving cell or SCell is determined based on beam management; and finally, beam information of a serving cell other than the reference serving cell or SCell in the same CSG can be determined based on the beam information of the reference serving cell or SCell, and after all beam information is determined, the QCL relationship and the beam information are indicated to the UE by using QCL indication signaling. Therefore, the base station does not need to perform beam management on a beam corresponding to each serving cell, and only needs to separately perform beam management for serving cells that do not have a QCL relationship, and performs beam management for only one of serving cells that have a QCL relationship, so that pilot and feedback overheads in a beam management process can be reduced.

In the foregoing embodiments, although the serving cell grouping and the QCL indication method for a spatial parameter are examples, the examples are also applicable to serving cell grouping and a QCL indication method for at least one piece of large-scale information in an average delay, a delay spread, a Doppler spread, and a Doppler shift.

Figure 6:
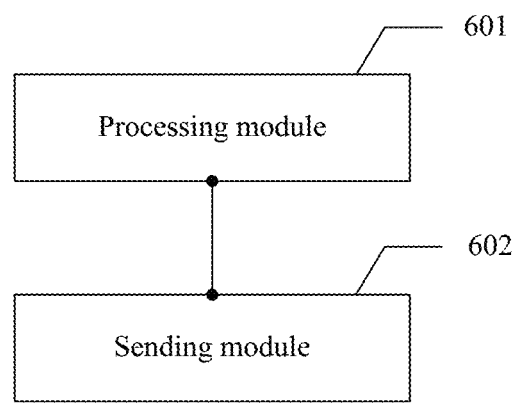
FIG. 6 is a diagram of an embodiment of a base station according to an embodiment of this application.

The foregoing describes the communications method in the embodiments of this application. The following briefly describes an apparatus embodiment for implementing the foregoing method. For technology implementation details, technical effects, and the like, refer to the foregoing method embodiment, and details are not described in the following again. The following describes a base station in the embodiments of this application. FIG. 6 is a diagram of an embodiment of a base station according to an embodiment of this application. The base station may include a processing module 601 and a sending module 602.

The processing module 601 is configured to: when the base station determines that there is a QCL relationship between antenna ports of at least two serving cells in a same serving cell group, send, to the UE by using the sending module 602, QCL indication signaling used to indicate that there is the QCL relationship between the antenna ports of the at least two serving cells, where the serving cell group is a group predefined according to a preset rule or is a group obtained after the base station groups serving cells allocated to the user equipment UE.

It can be learned that the serving cell group may be obtained in two different manners: In a first manner, the serving cell group is a group predefined according to the preset rule, for example, the predefined grouping manner is directly stipulated in a communication protocol between the base station and the UE; and in a second manner, the serving cell group is obtained after the base station groups the serving cells allocated to the user equipment UE. The two grouping manners each have been explained in the description of step 401 in the embodiment shown in FIG. 3b, and details are not described herein again.

It should be noted that if CCs in carrier aggregation are continuous or a distance between the CCs is relatively small, it may be considered that there is a QCL relationship between antenna ports of serving cells corresponding to the CCs about one or more of QCL parameters; or if CCs in carrier aggregation are discontinuous or a distance between the CCs is relatively large, it is considered that there is no QCL relationship between antenna ports of serving cells corresponding to the CCs about a QCL parameter. Therefore, if the serving cells are grouped in such a manner that there is a QCL relationship between antenna ports of serving cells in a same serving cell group, in one manner, CCs may be grouped based on a carrier frequency spacing. In addition, different beams correspond to different path transmission delays and different receive powers. Alternatively, CCs may be grouped based on a pointer timing relationship between different CCs.

Optionally, the serving cell group is obtained after the base station groups the serving cells allocated to the UE, and the sending module 602 is further configured to:

deliver information about the serving cell group to the UE by using higher layer signaling.

In the second case, the base station delivers the information about the serving cell group to the UE by using the higher layer signaling. This manner is similar to the description of step 401 in the embodiment shown in FIG. 3b, and details are not described herein again.

Optionally, there is a QCL relationship between antenna ports of serving cells in the same serving cell group.

The QCL relationship is set based on the second serving cell grouping manner in the embodiment shown in FIG. 3b. A QCL relationship determining manner may be similar to the first QCL determining manner in the embodiment shown in FIG. 3b, and details are not described herein again.

Optionally, the processing module 601 is specifically configured to:

send measurement pilots to the UE by using beams of the at least two serving cells;

receive a QCL determining indication or a beam ID that is determined by the UE and that is of a beam having target channel quality, where the QCL determining indication is a determining bit that is obtained by the UE through estimation and that is used to indicate whether the beams of the at least two serving cells meet a QCL relationship between spatial characteristic parameters; and determine, based on the received QCL determining indication or beam ID, that there is the QCL relationship between the antenna ports of the at least two serving cells.

This optional manner is similar to the second manner of determining QCL by sending measurement pilots by using beams of serving cells in the embodiment shown in FIG. 3b. In this manner, the base station receives the beam ID or the QCL determining indication sent by the UE, and can determine the QCL relationship based on the beam ID or the QCL determining indication, and details are not described herein again.

It should be noted that in this manner, a QCL relationship between antenna ports of serving cells in different serving cell groups can also be determined, so that the beam ID or the QCL determining indication of the UE can be used to feed back both a QCL relationship between antenna ports of two serving cells in a same TAG and a QCL relationship between antenna ports of serving cells in different TAGs. To be specific, in this embodiment of this application, not only the QCL relationship between the antenna ports of the serving cells in the same TAG can be determined, but also the QCL relationship between the antenna ports of the serving cells in the different TAGs can be determined. After determining is completed, the QCL relationship is sent to the UE by using the QCL indication signaling. Determining for the same TAG and the different TAGs can further reduce pilot and feedback overheads of beam management. Certainly, in this embodiment of this application, only the QCL relationship between the antenna ports of the serving cells in the different TAGs may be determined, and the QCL relationship between the antenna ports of the two serving cells in the same TAG is not determined. In this case, pilot and feedback overheads of beam management can also be reduced to some extent.

Optionally, the processing module 601 is specifically configured to:

determine, based on a carrier frequency spacing between or propagation paths of component carriers corresponding to the at least two serving cells, that there is the QCL relationship between the antenna ports of the at least two serving cells.

The QCL relationship determining manner may be similar to the third QCL determining manner in the embodiment shown in FIG. 3*b*, and details are not described herein again.

Optionally, the processing module 601 is further configured to:

group N serving cells corresponding to the UE into M serving cell groups, where N is greater than or equal to M, and both M and N are integers greater than or equal to 1; or group serving cells having a same timing advance and a same timing reference cell into a same timing advance group TAG The two serving cell grouping manners each are manners of predefining a group according to a preset rule. In the first serving cell grouping manner, grouping the N serving cells into the M groups may be directly grouping a CC1, a CC2, a CC3, . . . , and a CCn. For example, a CCs are directly grouped into one serving cell group in sequence. For example, the serving cell group includes three CCs. A serving cell group 1 includes the CC1, the CC2, and the CC3, and a serving cell group 2 includes the CC4, the CC5, and the CC6. This grouping manner may be directly defined by using a protocol. In this manner, the base station does not need to deliver information about a serving cell group to the UE by using higher layer signaling. Certainly, if the grouping manner is not defined by using a protocol, the base station also needs to notify the UE of information about a serving cell group by using higher layer signaling. In the second predefinition manner, the serving cells having the same timing advance and the same timing reference cell are grouped into the same TAG For a detailed grouping process of this manner, refer to the description of the first serving cell grouping manner in the embodiment shown in FIG. 3*b*, and details are not described herein again.

Optionally, there is a QCL relationship between antenna ports of serving cells in one TAG The QCL relationship is set based on the first serving cell allocation manner. A QCL relationship determining manner may be similar to the first QCL determining manner in the embodiment shown in FIG. 3*b*, and details are not described herein again.

Optionally, there is no QCL relationship between antenna ports of serving cells in different TAGs.

The QCL relationship is set based on the first serving cell allocation manner. A QCL relationship determining manner may be similar to the first QCL determining manner in the embodiment shown in FIG. 3*b*, and details are not described herein again.

Optionally, that there is the QCL relationship between the antenna ports of the at least two serving cells is that the antenna ports of the at least two serving cells have a same average channel gain or at least one same parameter in at least one spatial characteristic parameter. The spatial characteristic parameter includes at least one of an AoA, an AoD, a PAS-of-AoA, a PAS-of-AoD, a receiving antenna spatial correlation, a transmit antenna spatial correlation, receiving beamforming, and transmit beamforming.

The parameters have been described in the foregoing solution, and details are not described herein again.

Figure 7:
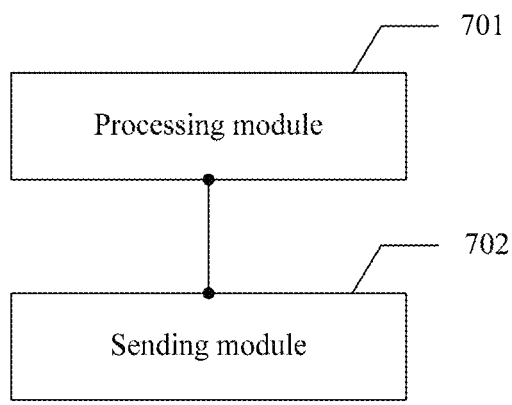
FIG. 7 is a diagram of an embodiment of a base station according to an embodiment of this application.

The foregoing describes a case of the base station in the embodiments of this application. The following describes another case of the base station in the embodiments of this application. FIG. 7 is a diagram of an embodiment of a base station according to an embodiment of this application. The base station includes a processing module 701 and a sending module 702.

The processing module 701 is configured to: when the base station determines that there is a QCL relationship between antenna ports of serving cells in different serving cell groups, send, to UE by using the sending module 702, QCL indication signaling used to indicate that there is the QCL relationship between the antenna ports of the serving cells in the different groups, where the serving cell groups are groups predefined according to a preset rule or are groups obtained after the base station groups serving cells allocated to the user equipment UE.

It can be learned that a difference between the base station in this embodiment and the base station in the embodiment shown in FIG. 6 is that in this embodiment, the QCL relationship between the antenna ports of the serving cells in the different serving cell groups is determined, and the QCL relationship is indicated to the UE by using the QCL indication signaling. Similarly, the serving cell groups may be obtained in two different manners: In a first manner, the serving cell groups are groups predefined according to the preset rule, for example, the predefined grouping manner is directly stipulated in a communication protocol between the base station and the UE; and in a second manner, the serving cell groups are obtained after the base station groups the serving cells allocated to the user equipment UE. The two grouping manners each have been explained in the description of step 401 in the embodiment shown in FIG. 3*b*, and details are not described herein again.

Optionally, the serving cell groups are obtained after the base station groups the serving cells allocated to the UE, and the sending module is further configured to:

deliver information about the serving cell groups to the UE by using higher layer signaling.

In the second case, the base station delivers the information about the serving cell groups to the UE by using the higher layer signaling. This manner is similar to the description of step 401 in the embodiment shown in FIG. 3*b*, and details are not described herein again.

Optionally, there is a QCL relationship between antenna ports of serving cells in the different serving cell groups.

The QCL relationship is set based on the second serving cell grouping manner in the embodiment shown in FIG. 3*b*. A QCL relationship determining manner may be similar to the first QCL determining manner in the embodiment shown in FIG. 3*b*. The setting manner is different from that in the embodiment shown in FIG. 6 that there is a QCL relationship between antenna ports of serving cells in a same serving cell group, and in this setting manner, there is the QCL relationship between the antenna ports of the serving cells in the different serving cell groups.

Optionally, the processing module 701 is specifically configured to:

send measurement pilots to the UE by using beams of the serving cells in the different groups;

receive a QCL determining indication or a beam ID that is determined by the UE and that is of a beam having target channel quality, where the QCL determining indication is a determining bit that is obtained by the UE through estimation and that is used to indicate whether the beams of the serving cells in the different groups meet a QCL relationship between spatial characteristic parameters; and determine the QCL relationship between the antenna ports of the different serving cells based on the QCL determining indication or the beam ID.

The optional manner is similar to the second manner of determining QCL by sending measurement pilots by using beams of serving cells in the embodiment shown in FIG. 3b. In this manner, the base station receives the beam ID or the QCL determining indication sent by the UE. Different from the embodiment shown in FIG. 6 in which the beam ID or the QCL determining indication is used to determine the QCL relationship between the antenna ports in the same serving cell group, in this embodiment, the beam ID or the QCL determining indication is used to determine the QCL relationship between the antenna ports of the serving cells in the different serving cell groups.

Optionally, the processing module 701 is specifically configured to:

determine, based on a carrier frequency spacing between or propagation paths of component carriers corresponding to the serving cells in the different serving cell groups, that there is the QCL relationship between the antenna ports of the serving cells in the different groups.

The QCL relationship determining manner may be similar to the third QCL determining manner in the embodiment shown in FIG. 3b. Different from the embodiment shown in FIG. 6 in which the carrier frequency spacing or the propagation path is used to determine the QCL relationship between the antenna ports in the same serving cell group, in this embodiment, the carrier frequency spacing or the propagation path is used to determine the QCL relationship between the antenna ports of the serving cells in the different serving cell groups.

Optionally, the processing module 701 is further configured to:

group N serving cells corresponding to the UE into M serving cell groups, where N is greater than or equal to M, and both M and N are integers greater than or equal to 1; or group serving cells having a same timing advance and a same timing reference cell into a same timing advance group TAG The two serving cell grouping manners each are manners of predefining groups according to a preset rule. In the first serving cell grouping manner, grouping the N serving cells into the M groups may be directly grouping a CC1, a CC2, a CC3, . . . , and a CCn. For example, a CCs are directly grouped into one serving cell group in sequence. For example, the serving cell group includes three CCs. A serving cell group 1 includes the CC1, the CC2, and the CC3, and a serving cell group 2 includes the CC4, the CC5, and the CC6. This grouping manner may be directly defined by using a protocol. In this manner, the base station does not need to deliver information about serving cell groups to the UE by using higher layer signaling. Certainly, if the grouping manner is not defined by using a protocol, the base station also needs to notify the UE of the information about the serving cell groups by using higher layer signaling. In the second predefinition manner, the serving cells having the same timing advance and the same timing reference cell are grouped into the same TAG For a detailed grouping process of this manner, refer to the description of the first serving cell grouping manner in the embodiment shown in FIG. 3b, and details are not described herein again.

Optionally, there is a QCL relationship between antenna ports of serving cells in different TAGs.

The QCL relationship is set based on the first serving cell allocation manner. A QCL relationship determining manner may be similar to the first QCL determining manner in the embodiment shown in FIG. 3b, and a difference is that in this embodiment, the QCL relationship between the antenna ports of the serving cells in the different serving cell groups is determined, and details are not described herein again.

Optionally, that there is the QCL relationship between the antenna ports of the at least two serving cells is that the antenna ports of the at least two serving cells have a same average channel gain or at least one same parameter in at least one spatial characteristic parameter. The spatial characteristic parameter includes at least one of an AoA, an AoD, a AS-of-AoA, a PAS-of-AoD, a receiving antenna spatial correlation, a transmit antenna spatial correlation, receiving beamforming, and transmit beamforming.

The parameters have been described in the foregoing solution, and details are not described herein again.

Figure 8:
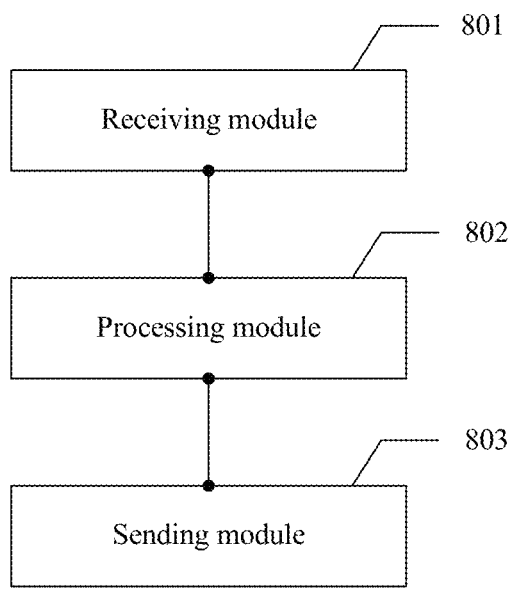
FIG. 8 is a diagram of an embodiment of a terminal according to an embodiment of this application.

The foregoing separately describes two types of base stations in the embodiments of this application. The following describes a terminal in the embodiments of this application. FIG. 8 is a diagram of an embodiment of a terminal according to an embodiment of this application. The terminal includes a receiving module 801 and a processing module 802.

The receiving module 801 is configured to receive QCL indication signaling delivered by a base station, where the QCL indication signaling is used to indicate that there is a QCL relationship between antenna ports of at least two serving cells in a same serving cell group, and the serving cell group is a group obtained after the base station groups serving cells allocated to the UE or is a group predefined according to a preset rule.

The processing module 802 is configured to determine, based on the QCL indication signaling, to receive reference signals of the serving cells by using a same receive beam or transmit reference signals of the serving cells by using a same transmit beam in the at least two serving cells whose antenna ports are in the QCL relationship and that are in the same serving cell group.

It can be learned that the QCL indication signaling received by the receiving module 801 is used to indicate that there is the QCL relationship between the antenna ports of the at least two serving cells in the same serving cell group. There are two different manners: In a first manner, the serving cell group is a group predefined according to the preset rule, for example, the predefined grouping manner is directly stipulated in a communication protocol between the base station and the UE; and in a second manner, the serving cell group is obtained after the base station groups the serving cells allocated to the user equipment UE. The two grouping manners each have been explained in the description of step 401 in the embodiment shown in FIG. 3b, and details are not described herein again.

In addition, a process of determining, by the processing module 802 based on the QCL indication signaling, to receive the reference signals of the serving cells by using the same receive beam or transmit the reference signals of the serving cells by using the same transmit beam in the at least two serving cells whose antenna ports are in the QCL relationship and that are in the same serving cell group has been described in four examples (1), (2), (3), and (4) in the embodiment shown in FIG. 3b, and details are not described herein again.

Optionally, the serving cell group is a TAG, and serving cells in a same TAG have a same timing advance and a same timing reference cell.

In a TAG grouping manner, serving cells having a same timing advance and a same timing reference cell are grouped into a same TAG For a detailed grouping process of this manner, refer to the description of the first serving cell grouping manner in the embodiment shown in FIG. 3b, and details are not described herein again.

Optionally, the receiving module 801 is further configured to receive measurement pilots that are sent by the base station by using beams of the at least two serving cells;

the processing module 802 determines, based on the beams of the at least two serving cells, a QCL determining indication or a beam ID of a beam having target channel quality, where the QCL determining indication is a determining bit that is obtained by the UE through estimation and that is used to indicate whether the beams of the at least two serving cells meet a QCL relationship between spatial characteristic parameters; and the terminal further includes a sending module 803, configured to feed back the QCL determining indication or the beam ID to the base station.

The receiving module 801, the processing module 802, and the sending module 803 can cooperate with the base station in completing beam management. A QCL relationship determining manner is similar to the second manner of determining QCL by sending measurement pilots by using beams of serving cells in the embodiment shown in FIG. 3b. In this manner, the base station receives the beam ID or the QCL determining indication sent by the UE, and can determine the QCL relationship based on the beam ID or the QCL determining indication, and details are not described herein again.

Optionally, the serving cell group is a group obtained after the base station groups the serving cells allocated to the UE, and the receiving module is further configured to:

receive information that is about the serving cell group and that is delivered by the base station by using higher layer signaling.

If the serving cell group is obtained after the base station groups the serving cells serving the UE, the base station delivers the information about the serving cell group to the UE by using the higher layer signaling. Certainly, information about the serving cell group obtained in the predefinition manner can also be delivered by using higher layer signaling.

Figure 9:
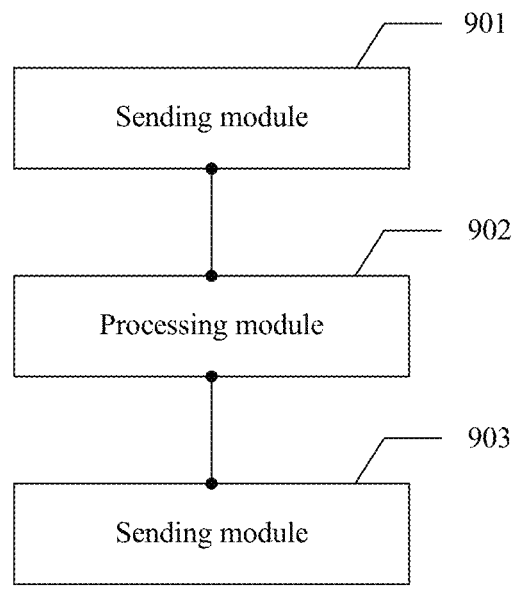
FIG. 9 is a diagram of an embodiment of a terminal according to an embodiment of this application.

The foregoing describes a case of the terminal in the embodiments of this application. The following describes another case of the terminal in the embodiments of this application. FIG. 9 is a diagram of an embodiment of a terminal according to an embodiment of this application. The terminal includes a receiving module 901 and a processing module 902.

The receiving module 901 is configured to receive quasi-co-location QCL indication signaling delivered by a base station, where the QCL indication signaling is used to indicate that there is a QCL relationship between antenna ports of serving cells in different serving cell groups, and the serving cell groups are groups obtained after the base station groups serving cells allocated to the UE or are groups predefined according to a preset rule.

The processing module 902 is configured to determine, based on the QCL indication signaling, to receive reference signals of the serving cells by using a same receive beam or transmit reference signals of the serving cells by using a same transmit beam in the serving cells whose antenna ports are in the QCL relationship and that are in the different serving cell groups.

It can be learned that the QCL indication signaling received by the receiving module 801 is used to indicate that there is the QCL relationship between the antenna ports of the serving cells in the different serving cell groups. There are two different manners: In a first manner, the serving cell groups are groups predefined according to the preset rule, for example, the predefined grouping manner is directly stipulated in a communication protocol between the base station and the UE; and in a second manner, the serving cell groups are obtained after the base station groups the serving cells allocated to the user equipment UE. The two grouping manners each have been explained in the description of step 401 in the embodiment shown in FIG. 3b, and details are not described herein again.

In addition, a process of determining, by the processing module 802 based on the QCL indication signaling, to receive the reference signals of the serving cells by using the same receive beam or transmit the reference signals of the serving cells by using the same transmit beam in the at least two serving cells whose antenna ports are in the QCL relationship and that are in the same serving cell group has been described in four examples (1), (2), (3), and (4) in the embodiment shown in FIG. 3b, and details are not described herein again.

Optionally, the serving cell group is a timing advance group TAG, and serving cells in a same TAG have a same timing advance and a same timing reference cell.

In a TAG grouping manner, serving cells having a same timing advance and a same timing reference cell are grouped into a same TAG For a detailed grouping process of this manner, refer to the description of the first serving cell grouping manner in the embodiment shown in FIG. 3b, and details are not described herein again.

Optionally, the receiving module 901 is further configured to receive measurement pilots that are sent by the base station by using beams of the serving cells in the different serving cell groups;

the processing module 902 determines, based on the beams of the serving cells in the different serving cell groups, a QCL determining indication or a beam ID of a beam having target channel quality, where the QCL determining indication is a determining bit that is obtained by the UE through estimation and that is used to indicate whether the beams of the at least two serving cells meet a QCL relationship between spatial characteristic parameters; and the terminal further includes a sending module 903, configured to feed back the QCL determining indication or the beam ID to the base station.

The receiving module 901, the processing module 902, and the sending module 903 can cooperate with the base station in completing beam management. A QCL relationship determining manner is similar to the second manner of determining QCL by sending measurement pilots by using beams of serving cells in the embodiment shown in FIG. 3b. In this manner, the base station receives the beam ID or the QCL determining indication sent by the UE, and can determine the QCL relationship based on the beam ID or the QCL determining indication, and details are not described herein again. It should be noted that this manner is different from that in the embodiment shown in FIG. 8 that the beam ID or the QCL determining indication is used to determine the QCL relationship between the antenna ports of the serving cells in the same serving cell group; and in this embodiment, the beam ID or the QCL determining indication is used to determine the QCL relationship between the antenna ports of the serving cells in the different serving cell groups.

Optionally, the serving cell groups are groups obtained after the base station groups the serving cells allocated to the UE, and the receiving module is further configured to:

receive information that is about the serving cell groups and that is delivered by the base station by using higher layer signaling.

If the serving cell groups are obtained after the base station groups the serving cells serving the UE, the base station delivers the information about the serving cell groups to the UE by using the higher layer signaling. Certainly, information about the serving cell groups obtained in the predefinition manner can also be delivered by using higher layer signaling.

Figure 10:
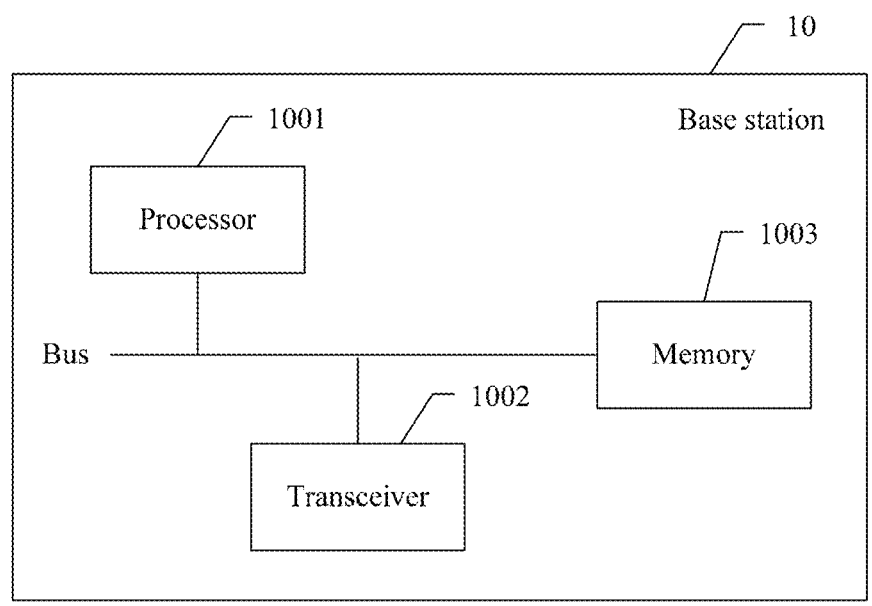
FIG. 10 is a diagram of an embodiment of a base station according to an embodiment of this application.

The following describes a structure of the base station in the embodiments of this application. FIG. 10 is a diagram of an embodiment of a base station according to an embodiment of this application. The base station 10 may include at least one processor 1001, at least one transceiver 1002, and a memory 1003 that are connected by using a bus. The base station in this embodiment of this application may have more or fewer components than those shown in FIG. 10, or two or more components may be combined, or there may be a different component configuration or setting. Each component may be implemented by hardware including one or more signal processing and/or dedicated integrated circuits, software, or a combination of hardware and software.

Specifically, for the embodiment shown in FIG. 6, the processor 1001 can implement a function of the processing module 601 of the base station in the embodiment shown in FIG. 6; the transceiver 1002 can implement a function of the sending module 602 of the base station in the embodiment shown in FIG. 6; and the memory 1003 has a plurality of types of structures, and is configured to store a program instruction. The processor 1001 is configured to execute the instruction in the memory 1003, to implement the communications method in the embodiment in FIG. 3b.

Specifically, for the embodiment shown in FIG. 7, the processor 1001 can implement a function of the processing module 701 of the base station in the embodiment shown in FIG. 7; the transceiver 1002 can implement a function of the sending module 702 of the base station in the embodiment shown in FIG. 7; and the memory 1003 has a plurality of types of structures, and is configured to store a program instruction. The processor 1001 is configured to execute the instruction in the memory 1003, to implement the communications method in the embodiment in FIG. 3b.

Figure 11:
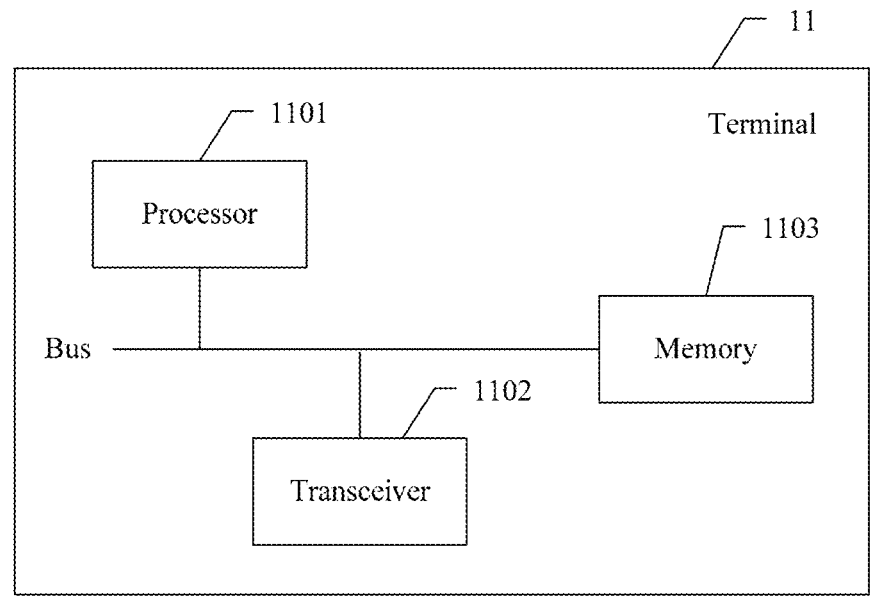
FIG. 11 is a diagram of an embodiment of a terminal according to an embodiment of this application.

The following describes a structure of the terminal in the embodiments of this application. FIG. 11 is a diagram of an embodiment of a terminal according to an embodiment of this application. The terminal 11 may include at least one processor 1101, at least one transceiver 1102, and a memory 1103 that are connected by using a bus. The base station in this embodiment of this application may have more or fewer components than those shown in FIG. 11, or two or more components may be combined, or there may be a different component configuration or setting. Each component may be implemented by hardware including one or more signal processing and/or dedicated integrated circuits, software, or a combination of hardware and software.

Specifically, for the embodiment shown in FIG. 8, the processor 1101 can implement a function of the processing module 802 of the base station in the embodiment shown in FIG. 8; the transceiver 1102 can implement functions of the receiving module 801 and the sending module 803 of the base station in the embodiment shown in FIG. 8; and the memory 1103 has a plurality of types of structures, and is configured to store a program instruction. The processor 1101 is configured to execute the instruction in the memory 1103, to implement the communications method in the embodiment in FIG. 3b.

Specifically, for the embodiment shown in FIG. 9, the processor 1101 can implement a function of the processing module 902 of the base station in the embodiment shown in FIG. 9; the transceiver 1102 can implement functions of the receiving module 901 and the sending module 903 of the base station in the embodiment shown in FIG. 9; and the memory 1103 has a plurality of types of structures, and is configured to store a program instruction. The processor 1101 is configured to execute the instruction in the memory 1103, to implement the communications method in the embodiment in FIG. 3b.

Figure 12A:
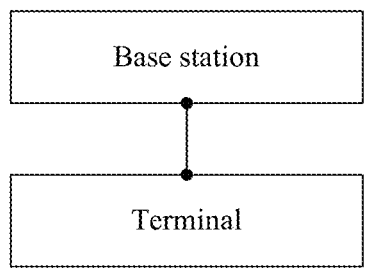
FIG. 12a is a diagram of an embodiment of a communications system according to an embodiment of this application.
Figure 12B:
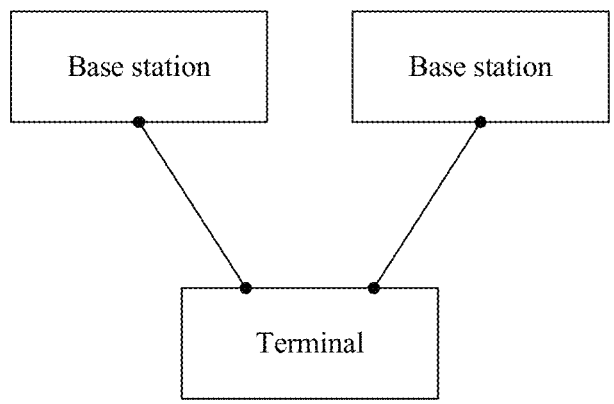
FIG. 12b is a diagram of an embodiment of a communications system according to an embodiment of this application.

The foregoing separately describes two types of base stations and two types of terminals in the embodiments of this application. The following describes a communications system in the embodiments of this application. FIG. 12a is a diagram of an embodiment of a communications system according to an embodiment of this application; and FIG. 12b is a diagram of an embodiment of a communications system according to an embodiment of this application. The communications system 12 includes one or two base stations in the embodiment shown in FIG. 10 and at least one terminal in the embodiment shown in FIG. 11. The one or two base stations in the embodiment shown in FIG. 10 are communicatively connected to the terminal in the embodiment shown in FIG. 11. Specifically, FIG. 12a includes one base station in the embodiment shown in FIG. 10 and one terminal in the embodiment shown in FIG. 11. The base station is communicatively connected to the terminal. FIG. 12b includes two base stations in the embodiment shown in FIG. 10 and one terminal in the embodiment shown in FIG. 11, and the terminal is connected to the two base stations. The base stations and the terminals in both FIG. 12a and FIG. 12b can cooperate with each other in performing the communications method in the embodiment shown in FIG. 3b.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A communications method, comprising:
    receiving, by user equipment (UE), quasi-co-location (QCL) indication signaling from a base station, wherein the QCL indication signaling is used to indicate that a QCL relationship exists between antenna ports of at least two serving cells in a same serving cell group, and wherein the same serving cell group is a group obtained after the base station groups serving cells allocated to the UE or is a group predefined according to a preset rule;
    determining, by the UE and based on the QCL indication signaling, to receive reference signals of the serving cells by using a same receive beam or transmit reference signals of the serving cells by using a same transmit beam in the at least two serving cells whose antenna ports are in the QCL relationship and that are in the same serving cell group;
    receiving, by the UE, measurement pilots from the base station by using beams of the at least two serving cells; and
    determining, by the UE based on the beams of the at least two serving cells, a QCL determining indication or a beam ID of a beam having target channel quality, wherein the QCL determining indication is a determining bit that is obtained by the UE through estimation and that is used to indicate whether the beams of the at least two serving cells meet a QCL relationship between spatial characteristic parameters.

2. The communications method according to claim 1, wherein the same serving cell group is a timing advance group (TAG), and wherein serving cells in a same TAG have a same timing advance and a same timing reference cell.

3. The communications method according to claim 1, wherein the same serving cell group is a group obtained after the base station groups the serving cells allocated to the UE, and the method further comprises:
    receiving, by the UE, information that is about the same serving cell group and that is from the base station by using higher layer signaling.

4. A communications method, comprising:
    receiving, by user equipment (UE), quasi-co-location (QCL) indication signaling from a base station, wherein the QCL indication signaling is used to indicate that a QCL relationship exists between antenna ports of serving cells in different serving cell groups, and wherein the different serving cell groups are groups obtained after the base station groups serving cells allocated to the UE or are groups predefined according to a preset rule;
    determining, by the UE based on the QCL indication signaling, to receive reference signals of the serving cells by using a same receive beam or transmit reference signals of the serving cells by using a same transmit beam in the serving cells whose antenna ports are in the QCL relationship and that are in the different serving cell groups;
    receiving, by the UE, measurement pilots from the base station by using beams of the serving cells in the different serving cell groups; and
    determining, by the UE and based on the beams of the serving cells in the different serving cell groups, a QCL determining indication or a beam ID of a beam having target channel quality, wherein the QCL determining indication is a determining bit that is obtained by the UE through estimation and that is used to indicate whether the beams of the at least two serving cells meet a QCL relationship between spatial characteristic parameters.

5. The communications method according to claim 4, wherein a serving cell group is a timing advance group (TAG), and wherein serving cells in a same TAG have a same timing advance and a same timing reference cell.

6. The communications method according to claim 4, wherein the method further comprises:
    receiving, by the UE, information that is about the different serving cell groups and that is from the base station by using higher layer signaling.

7. A terminal, comprising:
    a receiver, wherein the receiver is configured to:
        receive quasi-co-location (QCL) indication signaling from a base station, wherein the QCL indication signaling is used to indicate that a QCL relationship exists between antenna ports of at least two serving cells in a same serving cell group, and wherein the same serving cell group is a group obtained after the base station groups serving cells allocated to the terminal or is a group predefined according to a preset rule;
    at least one processor; and
    one or more memories coupled to the at least one processor and storing programming instructions for execution by the at least one processor to:

determine, based on the QCL indication signaling, to receive reference signals of the serving cells by using a same receive beam or transmit reference signals of the serving cells by using a same transmit beam in the at least two serving cells whose antenna ports are in the QCL relationship and that are in the same serving cell group;

wherein the receiver is further configured to receive measurement pilots from the base station by using beams of the at least two serving cells;

wherein the at least one processor determines, based on the beams of the at least two serving cells, a QCL determining indication or a beam ID of a beam having target channel quality, wherein the QCL determining indication is a determining bit that is obtained by the UE through estimation and that is used to indicate whether the beams of the at least two serving cells meet a QCL relationship between spatial characteristic parameters; and wherein the terminal further comprises a transmitter, the transmitter configured to feed back the QCL determining indication or the beam ID to the base station.

8. The terminal according to claim 7, wherein the same serving cell group is a timing advance group (TAG), and wherein serving cells in a same TAG have a same timing advance and a same timing reference cell.

* * * * *